US012709175B2

(12) United States Patent
Dor et al.

(10) Patent No.: US 12,709,175 B2
(45) Date of Patent: Aug. 18, 2026

(54) SYSTEM AND METHOD FOR WIRELESS VEHICLE BATTERY CHARGING

(71) Applicant: CHARGING ROBOTICS LTD., Tel Aviv (IL)

(72) Inventors: Ariel Dor, Ramat-Gan (IL); Hovav Gilan, Kadima (IL); Ari Manoach, Tel-Aviv (IL); Ariel Luzzatto, Holon (IL); Arnon Gilan, Haifa (IL)

(73) Assignee: CHARGING ROBOTICS LTD., Tel Aviv (IL)

( * ) Notice: Subject to any disclaimer, the term of this patent is extended or adjusted under 35 U.S.C. 154(b) by 675 days.

(21) Appl. No.: 18/268,433

(22) PCT Filed: Jan. 3, 2022

(86) PCT No.: PCT/IL2022/050005
§ 371 (c)(1),
(2) Date: Jun. 20, 2023

(87) PCT Pub. No.: WO2022/144901
PCT Pub. Date: Jul. 7, 2022

(65) Prior Publication Data

US 2024/0059169 A1 Feb. 22, 2024

Related U.S. Application Data

(60) Provisional application No. 63/133,544, filed on Jan. 4, 2021.

(51) Int. Cl.
*B60L 53/39* (2019.01)
*B60L 53/122* (2019.01)
(Continued)

(52) U.S. Cl.
CPC ............. *B60L 53/39* (2019.02); *B60L 53/122* (2019.02); *B60L 53/305* (2019.02); *B60L 53/65* (2019.02);
(Continued)

(58) Field of Classification Search
CPC ........ B60L 53/39; B60L 53/66; B60L 53/305; B60L 53/122; B60L 58/12; H02J 50/90
See application file for complete search history.

(56) References Cited

U.S. PATENT DOCUMENTS 9,660,487 B1 5/2017 Mu et al.
2017/0344024 A1 11/2017 Grufman et al.
(Continued)

FOREIGN PATENT DOCUMENTS

CN 106891741 6/2017
CN 107539155 11/2019
(Continued)

OTHER PUBLICATIONS

International Search Report of PCT/IL2022/050005 dated Mar. 27, 2022.
(Continued)

*Primary Examiner* — Robert Grant
(74) *Attorney, Agent, or Firm* — May Patents Ltd. c/o Dorit Shem-Tov

(57) ABSTRACT

Presented herein is a system and method for wireless power transmission (WPT) charging of a battery of a stationary electric vehicle (EV). The system comprises a plurality of autonomous mobile platforms adapted to charge the battery, wherein: the autonomous mobile platforms are configured to fit under the EV; and one or more autonomous mobile platforms are assigned in succession by the central control system to fully supply the charging requirements of the EV.
(Continued)

Also presented is a method for maximizing inductive WPT charging of a battery of a stationary EV.

50 Claims, 6 Drawing Sheets

(51) Int. Cl.

| | |
|---|---|
| ***B60L 53/30*** | (2019.01) |
| ***B60L 53/65*** | (2019.01) |
| ***B60L 53/66*** | (2019.01) |
| ***B60L 58/12*** | (2019.01) |
| ***H02J 50/90*** | (2016.01) |

(52) U.S. Cl.

CPC ............... *B60L 53/66* (2019.02); *B60L 58/12* (2019.02); *H02J 50/90* (2016.02)

(56) References Cited

U.S. PATENT DOCUMENTS

| | | | | |
|---|---|---|---|---|
| 2019/0070967 | A1* | 3/2019 | Ishigaki | B60L 8/003 |
| 2019/0202304 | A1* | 7/2019 | Moghe | B60L 53/38 |
| 2019/0315240 | A1 | 10/2019 | Wu | |
| 2019/0379232 | A1 | 12/2019 | Lemdiasov et al. | |
| 2020/0361329 | A1 | 11/2020 | Schütz et al. | |

FOREIGN PATENT DOCUMENTS

| | | |
|---|---|---|
| DE | 102011118397 | 5/2012 |
| EP | 2684733 | 1/2014 |
| KR | 101410272 | 6/2014 |
| KR | 20200046724 | 5/2020 |
| KR | 102120255 | 6/2020 |
| WO | 2014/33094 | 3/2014 |

OTHER PUBLICATIONS

Zicheng B., Tianze K., Chunting C., Yiming Z., Zhengming Z., Gregory A. K., “A review of wireless power transfer for electric vehicles: Prospects to enhance sustainable mobility”, Elsevier, 2016 (29 pages).

Gradient Descent, https://en.wikipedia.org/wiki/Gradient descent (6 pages).

Kurs A., Karalis A., Moffatt, R., Joannopoulos J.D., Fisher P., Soljacic M., “Wireless Power Transfer via Strongly Coupled Magnetic Resonances”. Science 2007, 317, 83-86 (4 pages).

Data-sheet of CS-45AL—“Open Loop Hall-Effect Current Sensor”, Downloaded from www.panucatt.com by Panucatt Devices LLC of Irvine, California, USA, date unknown (2 pages).

Bouanou T., El Fadil H., Lassioui A., Assaddiki O. and Njili S., “Analysis of Coil Parameters and Comparison of Circular, Rectangular, and Hexagonal Coils Used in WPT System for Electric Vehicle Charging”, World Electric Vehicle Journal, Mar. 17, 2021 (26 pages).

Patil D., Mcdonough M. K., Miller J. M., Fahimi B., and Balsara P. T., “Wireless Power Transfer for Vehicular Applications: Overview and Challenges”, IEEE Transactions on Transportation Electrification, vol. 4, No. 1, Mar. 2018 (36 pages).

Abdolkhani A., “Fundamentals of Inductively Coupled Wireless Power Transfer Systems”, IntechOpen Book Series, 2016, https://www.intechopen.com/chapters/50520 (25 pages).

* cited by examiner

SYSTEM AND METHOD FOR WIRELESS VEHICLE BATTERY CHARGING

FIELD OF THE INVENTION

The invention is from the field of transportation. Specifically the invention relates to electrical vehicles. More specifically the invention relates to wireless charging of the battery/batteries in an electric vehicle.

BACKGROUND OF THE INVENTION

As used herein, the term "electric vehicle" (abbreviated EV) is used to refer to "pure" electric vehicles and to hybrid electric vehicles, which are vehicles that utilize energy stored in batteries to provide electricity-based driving energy.

As used herein the term "vehicle" is used in a generic sense to include any type of EV, e.g. cars, trucks, vans, buses, and minibuses, motorcycles, electric bicycles, and scooters.

Despite obvious advantages for the environment, a major reason for consumer's reluctance to move from vehicles powered by petroleum products to EVs is the capacity of the EV's batteries, which allow travel of relatively short distances and have to be recharged frequently. Vehicle batteries may be charged via a plug-in interface or by employing wireless power transmission (WPT). WPT-based vehicle battery charging techniques offer many practical advantages over plug-in charging interfaces. One main advantage is that WPT obviates the need of physically coupling the power source with the vehicle battery. However, compared to plug-in interfaces, WPT systems are usually wasteful, as only a fraction of the energy that is output by a charge transmitter of the WPT system is received by a charge receiver, for instance, due to suboptimal charge transmitter-receiver alignment.

WPT techniques generally fall into two categories, namely near-field and far-field WPT. Far-field WPT techniques are based on electromagnetic radiation such as lasers and microwaves.

One nearfield WPT charging technique is based on inductive charging, where a charge transmitter comprising a first coil configured as a transmit antenna and a second charge coil configured as a receive antenna are configured and arranged to magnetically couple the two antennas with each other. A changing magnetic field that is generated by the transmit antenna is picked up by the receive antenna which, in turn, induces an electromotive force in the receive antenna. The generated electromotive force creates an oscillating current which is then used to charge the vehicle battery. A second WPT charging method is based on capacitive electric field coupling between a pair of conductive plates. Although both systems can be used for EV charging, inductive charging is the most common.

Various methods have been developed for near field WPT charging of EVs. One method in which considerable effort has been expended by many different research groups in several countries is by means of a plurality of transmitting inductive coils or capacitor plates installed at the surface of a roadway and corresponding receiver plates on the underside of the EV. In this way the battery of the EV can be charged as the vehicle travels along the road. Such systems are thought by many researchers to be an ideal solution to the distance limitations imposed on EV use by the capacity of the onboard batteries. However, their development until the stage of practical systems is hindered by many factors including the cost of installing and maintaining the systems; alignment of the transmitting and receiving plates for optimal power transfer, which is difficult under normal traffic conditions; knowing whether a vehicle approaching a first plate in a series requires charging and if it comprises a compatible receiver; hand-off to the next plate; measuring the amount of power generated by the transmitter; payment; and others.

To overcome the problems associated with bringing the EV to a charging station, systems have been proposed in which the EV is parked and a power source and induction coil is transported to the EV to charge the batteries of the EV.

It is a purpose of the present invention to provide a WPT based system comprising a plurality of autonomous charging platforms each of which is configured to navigate to and charge the battery of an EV.

It is another purpose of the present invention to provide a WPT based system comprising a plurality of autonomous charging platforms each of which carries a rechargeable power storage unit to provide energy to propel the charging platform, operate components on the mobile platform, and charge batteries of an EV.

It is another purpose of the present invention to provide a WPT based system and method for charging the battery of an EV that provides maximum power transfer efficiency between charge receivers of the EV and charge transmitters.

It is another purpose system that provides the owner of an EV with a convenient method of charging the battery of their EV.

It is another purpose of the present invention to provide a WPT based system that makes use of third party data to prepare navigation and charging processes.

Further purposes and advantages of this invention will appear as the description proceeds.

SUMMARY OF THE INVENTION

In a first aspect presented herein is a system for wireless power transmission (WPT) charging of a battery of a stationary electric vehicle (EV). The system comprises a plurality of autonomous mobile platforms adapted to charge the battery, wherein:

A) the autonomous mobile platforms are configured to fit under the EV; and

B) one or more autonomous mobile platforms are assigned in succession by the central control system to fully supply the charging requirements of the EV.

Embodiments of the system comprise:

a) at least one charging station comprising a power module comprising components configured to control and monitor transfer of electricity to rechargeable power storage units on the autonomous mobile platforms;

b) a central control system;

wherein each autonomous mobile platform comprises:

i) a charge transmitter and electric circuit configured for WPT to a charge receiver on the underside of the EV;

ii) a drive mechanism configured to propel and steer the mobile platform;

iii) a rechargeable power storage unit configured to supply energy for WPT, to supply energy to onboard sensors, an onboard processor, an onboard memory and communication components, and to the drive mechanism; and at least one of:

iv) at least one on board sensor;

v) a WPT analysis and control unit, wherein the WPT analysis and control unit is configured to activate the charge transmitter and to analyze information from circuitry and a sensor or sensors associated with the charge receiver on the EV or with the charge transmitter on the mobile platform to provide feedback information allowing the mobile platform to navigate into a position and orientation relative to the charge receiver on the EV that allows for an optimal power transfer efficiency;

vi) an onboard processor;

vii) an onboard memory unit;

viii) navigation software in the onboard processor configured to navigate the mobile platform autonomously to and from a location under the EV based on information received from at least one of: the EV, a third party source or sources, a control system, and the on board sensors; and ix) communication components;

In embodiments of the system both the charge transmitter and the charge receiver each comprise one of:

a) a coil and accompanying electronic circuitry and sensors configured for near-field inductive WPT from the autonomous mobile platform to the EV; and b) a conducive plate and accompanying electronic circuitry and sensors configured for near-field capacitive WPT from the autonomous mobile platform to the EV.

In embodiments of the system the charge transmitter and the charge receiver each comprise coils configured for inductive WPT and the information analyzed by the WPT analysis and control unit to provide the feedback information comprises a cost function that is proportional to the real power delivered to the transmitting coil on the mobile platform. In embodiments of the system the cost function is computed by direct measurement of a voltage and a current supplied to the transmitting coil, and by estimating the phase difference between the voltage and the current.

In embodiments of the system the drive mechanism comprises independently controlled drive chains configured to power omni or Mechanum wheels.

In embodiments of the system the system is configured to operate in indoor, outdoor, and combined indoor and outdoor public and private parking lots or EV charging locations.

In embodiments of the system the navigation software associated with the onboard processor is configured for controlling the drive mechanism to steer the mobile platform on an available energy efficient route to and from the EV.

In embodiments of the system the communication components on the mobile platform are configured to allow two way wireless communication between components on mobile platform and components of other entities in the parking lot selected from: EVs, charging stations, the central control system, and other mobile platforms.

In embodiments of the system the WPT analysis and control unit comprises electric circuitry and software in the onboard processor configured to utilize information from onboard sensors and other information such as feedback from circuitry and sensors associated with charge receiver to initiate and optimize WPT from the rechargeable power storage unit via the charge transmitter to the charge receiver.

In embodiments of the system the charging station comprises one or more power modules comprising electrical circuitry and other components configured to control and monitor transfer of electricity for charging the rechargeable power storage unit on the mobile platform by means of electric power from an electricity grid.

In embodiments of the system transfer of electricity ends when the rechargeable power storage unit on mobile platform is fully charged or when the mobile platform is instructed to leave on another mission, even if the rechargeable power storage unit isn't fully charged.

In embodiments of the system the power module comprises electricity sockets on one of its walls connected to a power grid, the mobile platform comprises prongs configured to be compatible with slots in the electric socket that protrude from one of the sides of the mobile platform, and, when the mobile platform returns to a charging station, it approaches the electricity socket and the prongs on the mobile platform enter the slots in the socket and recharging of the rechargeable power storage unit on the mobile platform begins automatically.

In embodiments of the system the system comprises off-board sensors located at any place in the parking lot configured to keep overall surveillance on activities in the parking lot and/or to aid in navigating a mobile platform back and forth between a charging station and an EV that is parked in the parking lot.

In embodiments of the system the off-board sensors are chosen from: video cameras and generators of optical, Bluetooth, weight sensors, microphones or RFID signals.

In embodiments of the system the control system is configured to receive information on incoming vehicles, to schedule the charging operations based on the expected time of arrival and charging requirements of customer's vehicles, and assigning tasks to available mobile platforms, the central control system comprising:

i) one or more computers or processors;

ii) one or more memory units; and iii) communication components,

In embodiments of the system:

a) the communication components of the control system are configured to allow two-way communication with the charging stations and mobile platforms under control of the central control system and outside entities such as: customers and/or their vehicles, controlling systems in other parking lots the employ the system, and a central office of the company that has overall responsibility for all parking lots employing the system; and b) the at least one computer or processor of the control system is programmed with dedicated computer software containing one or more programs written to perform particular functions related to operations of the system.

In embodiments of the system the control system comprises at least one of the following:

a) input/output devices for manually entering instructions or information into the computer or processor or the memory or displaying information related to operation of the system; and b) a billing system wherein data relating to charging sequences are stored in the memory device for ongoing or post-charging analysis.

In embodiments of the system a single central controlling system is configured to handle more than one parking lot.

In embodiments of the system at least one of the components and/or the functions of the central controlling system can be handled by components in one or more of the charging stations or on one or more of the mobile platforms.

In embodiments of the system the system comprises artificial intelligence functionalities and employs machine learning models for updating dedicated computer programs that control the system to continually improve all aspects of the service provided to the client and operation of the system.

In embodiments of the system the mobile platform is configured such that elements of the mobile platform are non-removably embedded in a housing of the mobile platform.

Embodiments of the system comprise an alarm subsystem and/or at least one camera configured to detect and/or record attempts to forcefully gain access to and/or remove one or more elements of the mobile platform and to provide an alarm and/or visual output.

In embodiments of the system some of the components of the mobile platform and/or their functions may be located and/or carried out by other components in the central control system or a charging station.

In embodiments of the system, in addition to a main receiver coil, the charge receiver comprises auxiliary receiver coils to inductively charge the battery of the EV using frequencies which are outside the resonant frequency of the main receiver coil.

In embodiments of the system the charge transmitter coils of the mobile platform are configured to be moved upwards relative to the mobile platform and/or the charge receiver coils of the EV are configured to be moved downwards relative to the vehicle for additional wireless power transfer optimization.

In embodiments of the system the mobile platforms are programmed to leave the confines of a parking lot to recharge an EV parked on an outside street.

In embodiments of the system the mobile platforms are small enough that the EV is able to drive over the mobile platform when the mobile platform is between the wheels of EV.

In embodiments of the system some or all of the parking spaces comprise a central section that is lower than the remainder of the floor in the parking lot to allow charging batteries of EVs having a lower than standard chassis, In a second aspect presented herein is a method of operating the system of the first aspect for charging the batteries of an EV. The method comprises:

a) the central control system gathers information from several sources about the EV, it's charging requirement, and the time frame in which it will be available to receive a WPT charging service;

b) the central control system determines a priority list for providing WPT to each incoming EV and determines the number of mobile platforms required to fulfill the charging requirement for the EV;

c) the EV enters a parking lot comprising the system of claim 1 and parks in an empty parting spot;

d) the central control system uses information from off-board sensors in the parking lot and one or more methods of identifying and designating the location of the EV in the parking lot;

e) the central control system receives up to date information on the location and charge status of the rechargeable power storage units of each of the mobile platforms in the parking lot and uses that information to select the mobile platform most suitable to charge a particular EV;

f) the central control system uses its communication components to send to the communication components on the selected mobile platform instructions and information related to the mission;

g) the selected mobile platform uses the navigation software and the onboard sensors to control the drive mechanism to navigate to the location of the EV requiring WPT charging;

h) the selected mobile platform uses the navigation software and the onboard sensors to control the drive mechanism to navigate under the chassis of the EV requiring WPT charging, whereupon the WPT analysis and control unit activates the charge transmitter to begin transmitting in the direction of the charge receiver;

i) one or more sensors associated with the charge receiver on the EV or with the charge transmitter on the mobile platform measure one or more near-field WPT charging characteristics and provide feedback to the mobile vehicle to change its position until the relative positions and orientations of the charge transmitter and charge receiver are aligned to optimize the power transfer;

j) the WPT analysis and control unit receives a message that the power in the rechargeable power storage unit on the mobile platform that is available for transmitting to an EV has been consumed or from the EV that the batteries of the EV are fully charged or from the central control system to stop activation of the charge transmitter;

k) the WPT analysis and control unit stops activation of the charge transmitter and the mobile platform navigates back to a charging station having a power module that is not engaged in charging the rechargeable power storage unit on another mobile platform;

l) the mobile platform enters the charging station and automatically connects electrically to the power module;

m) the power module automatically transfers electricity from a power grid to the rechargeable power storage unit on the mobile platform and monitors the process to stop the transfer when the rechargeable power storage unit is fully charged or it receives instructions from the central control system to release the mobile platform before it is fully charged;

n) if the charging requirements of the EV have not been fulfilled, then steps 108 to 124 are repeated for one or more successive mobile platforms as determined in step 102.

In embodiments of the method, in step a, the information is provided to the central control system by one or more of:

a) the customer, using an application on his smartphone, by telephone/cell phone, or by email;

b) from the computer of the EV;

c) from third part sources; and d) using input devices of the central control system.

In embodiments of the method, in step b, information relevant to determining the priority includes: the number of EVs to be serviced relative to the number of available mobile platforms, the expected time of arrival of each EV, the state of charge of the batteries on the EVs, and the expected time frame within which the EV will be in the parking lot.

In embodiments of the method, in step b, human intervention is allowed to determine the scheduling priority.

In embodiments of the method, in step c, the driver may park his vehicle in a parking space that has been reserved for him or in any available space.

In embodiments of the method, in step d, the location of the parked EV is detected by video cameras that track the movements of the EV after it enters the parking lot.

In embodiments of the method, in step d, the location of the parked EV is designated by one or more of: coordinates in a world reference frame, a space-based global navigation satellite system, internal maps of the parking lot; and optical or RFID markers distributed throughout the parking lot.

In embodiments of the method, in step e, the criterion for selecting the mobile platform for a specific charging mission include: compatibility of the charge transmitter on the mobile platform with the charge receiver on the EV, amount of clearance under the charge receiver, distance from the present location of the mobile platform to the EV, charge status of the rechargeable power storage unit on the mobile platform, and whether the mobile platform is presently on a mission to charge the batteries of a different EV.

In embodiments of the method in step f, the mission instructions and useful information include at least one of, the location of the EV as determined in step 106, the locations of optical or RFID markers distributed throughout the parking lot, the type and/or model of the EV, the color of the EV, and the corresponding charge receiver configuration including the charge receiver's exact position and orientation in the EV.

In embodiments of the method, in step g, the onboard sensors that control the drive mechanism include at least one of: accelerometers, gyroscopes, barometers, proximity sensors, altimeters, magnetometers, light sensors, cameras, RFID sensors, Bluetooth receivers, and receivers of GPS or GLONASS signals.

In embodiments of the method, in step g, onboard sensors are configured to detect objects that hinder the mobile platform's approach to the optimal charging position and orientation relative to the vehicle whose battery is to be charged.

In embodiments of the method in step i the charge transmitter and the charge receiver each comprise coils configured for near-field inductive WPT and the WPT charging characteristic that is measured to provide feedback to the mobile vehicle is a cost function that is proportional to the real power delivered to the transmitting coil on the mobile platform.

In embodiments of the method the cost function is computed by direct measurement of a voltage and a current supplied to the transmitting coil, and by estimating the phase difference between the voltage and the current.

In embodiments of the method mobile platforms are programmed to leave the confines of a parking lot to recharge an EV parked on the street outside.

In a third aspect presented herein is a method for maximizing inductive wireless power transmission (WPT) charging of a battery of a stationary electric vehicle (EV), the comprising:

a) position a transmitting coil that is located on a top surface of a mobile platform under a receiving coil that is mounted on the bottom of a chassis of the EV;

b) instruct the mobile platform to spin slowly until a measured cost function reaches a maximum value, wherein $\phi_0=\phi(0,0)$ is the value of the cost function at the horizontal position that coincides with the origin of the present (temporary) ground coordinate system, and the cost function $\phi(x,y)$ is described in the present x-y coordinate system with respect to ground;

c) instruct the mobile platform to take a small jump $\Delta x$ to the right in direction i and, after the jump is completed, to measure the value of the cost function $\phi$, to denote the measured value by $\phi_x=\phi(\Delta x,0)$, and to compute the ratio $$\frac{\Delta\phi}{\Delta x}=\frac{\phi_x-\phi_0}{\Delta x};$$

d) instruct the mobile platform to reposition itself to the initial location by taking a step $-\Delta x$ to the left;

e) instruct the mobile platform to take a small jump $\Delta y$ forwards in direction j and, after the jump is completed, to measure the value of the cost function $\phi$, to denote the measured value by $\phi_y=\phi(0,\Delta y)$, and to compute the ratio $$\frac{\Delta\phi}{\Delta y}=\frac{\phi_y-\phi_0}{\Delta y};$$

f) instruct the mobile platform to reposition itself to the initial location by taking a step $-\Delta y$ backwards;

g) compute $\nabla\phi$=the gradient of $\phi$, to be the vector $$\nabla\phi=\frac{\partial\phi}{\partial x}i+\frac{\partial\phi}{\partial y}j\approx\frac{\Delta\phi}{\Delta x}i+\frac{\Delta\phi}{\Delta y}j;$$

h) compute the norm $\|\nabla\phi\|$ of $\nabla\phi$ as $$\|\nabla\phi\|=\sqrt{\left(\frac{\partial\phi}{\partial x}\right)^2+\left(\frac{\partial\phi}{\partial y}\right)^2};$$

i) compute the unit-norm vector R in direction of $\nabla\phi$ as $$R=\frac{\nabla\phi}{\|\nabla\phi\|}=R_xi+R_yj,\ R_x=\frac{\partial\phi/\partial x}{\|\nabla\phi\|},\ R_y=\frac{\partial\phi/\partial y}{\|\nabla\phi\|}\Rightarrow\|R\|=\sqrt{R_x^2+R_y^2}=1;$$

j) instruct the mobile platform to take a jump $\gamma R$ of size $\gamma\geq 0$ in direction R by moving a distance $\gamma R_x$ in direction I and a distance $\gamma R_y$ in direction j;

k) if no substantial increase is found in measuring the value of the cost function $\phi$ during several iterations or if the variance of the displacement over several $\gamma$ jumps approaches zero then a "stable state" is declared and the alignment is terminated; else go to step 11;

l) return to step 1.

In embodiments of the method for maximizing WPT step b is not necessary if the transmitting coil and the receiving coil both have circular geometries.

In embodiments of the method for maximizing WPT the cost function is proportional to the real power delivered to the transmitting coil on the mobile platform.

In embodiments of the method for maximizing WPT the cost function is computed by direct measurement of a voltage and a current supplied to the transmitting coil, and by estimating the phase difference between the voltage and the current.

In embodiments of the method for maximizing WPT the cost function has more than one local maximum and aligning with a locally optimal point may still provide satisfactory WPT charging. In these embodiments all of the multiple local maximums may have substantially similar cost functions, in which case optimal WPT charging occurs at more than one maximum value of the cost function.

All the above and other characteristics and advantages of the invention will be further understood through the following illustrative and non-limitative description of embodiments thereof, with reference to the appended drawings.

DETAILED DESCRIPTION OF EMBODIMENTS OF THE INVENTION

Publications and other reference materials referred to in this section are numerically referenced in the following text and respectively grouped in the appended Bibliography which immediately precedes the claims.

The invention is a system and method for wireless power transmission (WPT) charging the battery of an electric or hybrid vehicle (collectively interchangeably referred to herein as a “vehicle” of an “electric vehicle” or abbreviated as “EV”). The system is for charging stationary vehicles and comprises at least one mobile platform that seeks out and travels to the EV to be charged. The mobile platform carries a transmitter, battery, and electric circuit configured for WPT to a receiver on the underside of the EV.

Prior art systems based on this concept are described in EP2684733 [8] and WO2014/33094 [9].

Before describing the present system in detail, a description of examples of typical scenarios in which the inventors envisage the invention operating will be presented.

The WPT system of the invention will be provided in dedicated locations, where drivers drive their EV’s for charging, and then drive away (or pick them up if the EV’s are left there for a suitable length of time). These dedicated locations can be, for example, public or private parking lots in which users will park their EVs. Such parking lots can be indoor or outdoor lots or a combination of both. For example, under multi-story apartment or office buildings; under, above or outside of shopping malls; multi-story parking facilities, e.g. at airports; multi-story towers that use elevators to move cars between floors, and parking towers in which cars are automatically parked; municipal or privately operated lots; lots outside railroad stations and airports; and lots outside of sports arenas. The WPT system of the invention can also be used at gas stations, restaurants, and rest areas alongside highways and roads enabling travelers to recharge their EV while making a short “pit stop”.

Figure 1:
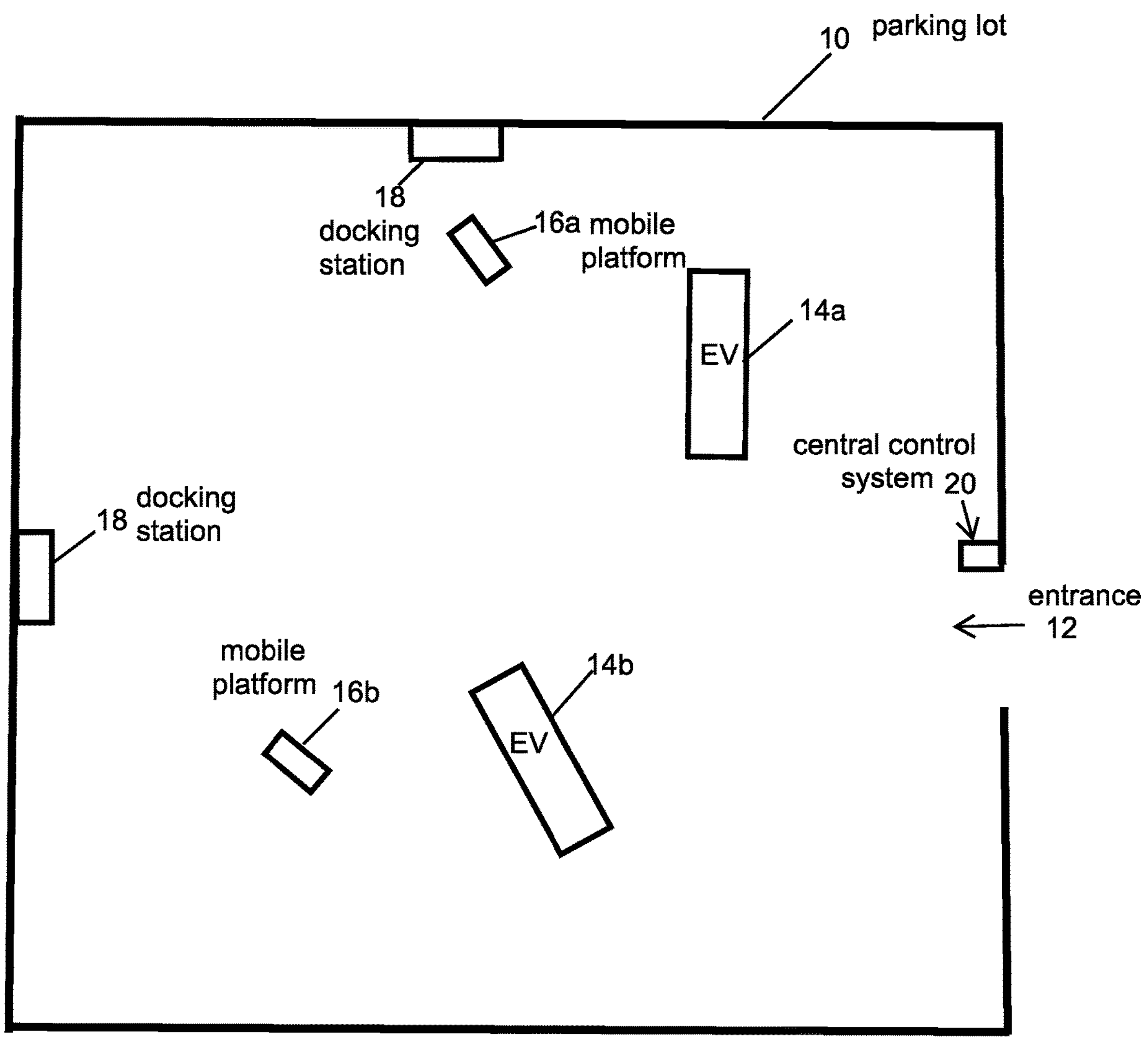
FIG. 1 schematically shows the basic elements inside the parking lot of the WPT system.

FIG. 1 schematically shows the basic elements of the WPT system that are located in a parking lot. In this simplified figure, are seen two mobile vehicles 14 that have entered parking lot 10 through entrance 12 and parked at random locations in the interior. Depending, inter alia, on the capacity of the parking lot, each facility will include several mobile platforms 16 that carry, inter alia, a charge transmitter and accompany circuitry configured for wireless transmission (WPT) of energy to recharge the battery of an EV 14, a drive mechanism, sensors and control circuits configured to enable autonomous travel of the mobile platform 16 around the floor of the parking lot 10, and a rechargeable power storage unit, e.g. a set of rechargeable batteries, configured to provide the power necessary to operate all electric components on the mobile platform 16, to propel the mobile platform 16, and to supply the energy for the WPT transmission to the receiving vehicle 14. The system also comprises at least one central control system 20 in each parking lot 10 responsible for, inter alia, receiving information on incoming vehicles 14 requiring charging, assigning tasks to one or more of the mobile platforms 16, and communicating with the mobile platforms 16 under its control to receive, inter alia, information about the state of charge of the mobile platform’s batteries and amount of power transmitted to a customer’s vehicle 14 for billing purposes. The parking lot 10 must also contain at least one charging station 18 to which the mobile platforms 16 are able to return to recharge their rechargeable power storage units when necessary. In the illustrated scenario, mobile platform **16*a* has been dispatched by the central control system 20 and has left charging station 18*a* with its rechargeable power storage unit fully charged on a mission to navigate to and to charge the battery of parked EV 14*a*. Mobile platform 16*b* has completed its mission of charging EV14*b* and is returning to charging station 18*b*** to recharge its on-board rechargeable power storage unit in preparation for its next mission.

It is noted that the present invention provides charging service to any type of electric vehicle 14 that comprises a receiving coil that is configured for WPT charging of the vehicle’s battery located under the vehicle and that has enough ground clearance for a mobile platform 16 to move under it.

As written above, FIG. 1 is a schematic drawing meant to introduce the principle components of the system. The components illustrated will be discussed in more detail herein below; however in an actual system there can be more or less mobile platforms 16 and charging stations 18 than shown. Also some or all of the functions of the central control system 20 may be performed at a location remote from the parking lot or by components on one or more of the mobile platforms 16 or in one or more of the charging stations 18.

The mobile platforms 16 may be wheeled or tracked vehicles; however their exact design and means of propulsion are not part of the present invention and will not be discussed herein in detail. The main requirements for them is that they must be strong enough to carry all of the components described herein, have a maximum dimensions including all components they carry that allow at least the transmitter of the WPT energy to fit under the chassis of the vehicle 14 whose battery is to be charged in order to enable efficient coupling with the receiver on the EV 14. The mobile platforms 16 are small enough that they fit completely under the vehicle 14 allowing the vehicle 14 to drive over the mobile platform 16 when the mobile platform 16 is between the wheels of the vehicle 14. In parking lots in which the WPT system is installed, some or all of the parking spaces may comprise a central section that is lower than the rest of the floor of the parking lot to allow charging batteries of EVs 14 having a lower than standard chassis, e.g. certain models of sports cars.

The requirement that the mobile platforms 16 are small enough to fit at under the vehicle 14 places a restraint on the volume of the payload that a mobile platform 16 can carry. Specifically this limits the size and corresponding capacity in kWhr of the rechargeable power storage unit, e.g. batteries, each mobile platform is able to bring to the EV. In other words the amount of energy in the rechargeable power storage unit on each of the autonomous mobile platforms that is available for transmitting to an EV is less than the capacity of the batteries on the EV.

For example, in a typical embodiment using presently available battery technology, the rechargeable power storage units on the mobile platforms 16 of the present invention are designed to be able to transmit between 5-6 kWhr of energy to an EV on each charging mission. Assuming that the battery of an EV requires about 80 kWhr to be fully charged, the present system will require, for example, three mobile platforms 16 alternately running back and forth a total of 15 times in succession between the EV 14 and a charging station 18 in order to fully charge a low battery of the EV 14. This may seem very inefficient; however the system has very significant advantages. An important consideration is an economic advantage—the capital cost. If the cost of a battery capable of delivering 1 kWhr is X, then for a mobile platform carrying a single battery capable of fully charging the EV the cost of the battery will be 80X. For the three small mobile platforms 16 the total cost for the three rechargeable power storage units needed to charge the EV will be 15X. This represents approximately an 80% savings in battery cost and a 40% savings in the overall cost of the three mobile platforms 16, since it is estimated that the battery will cost approximately 50% of the cost of the mobile platform. It is also to be realized that according to the present system, the duration of complete charging of EV 14 is independent of the battery capacity used in the charging mobile platform 16, and is therefore not a consideration by which the optimal capacity of the charging battery needs to be decided.

Additional advantages of the use of the small mobile platforms 16 over larger platforms that carry large capacity batteries are lower construction costs, lower power requirements for propelling the mobile platform, easier maneuverability, and less interference with the traffic flow through the parking lot. The use of several small mobile platforms provides the system with great flexibility. For example, if an EV will only be in a parking lot for a short period of time and only requires a small top-up charge to fill its batteries, the present system can assign only one or two mobile platforms 16 to complete the task at a lower cost than sending a large mobile platform carrying a large capacity battery.

As battery technology improves lowering both the size and the cost of batteries for both EVs and the mobile platforms used to recharge them it is anticipated that the advantages of the system described herein will retain and possibly improve upon its relative advantages over systems using large mobile platforms.

Figure 2:
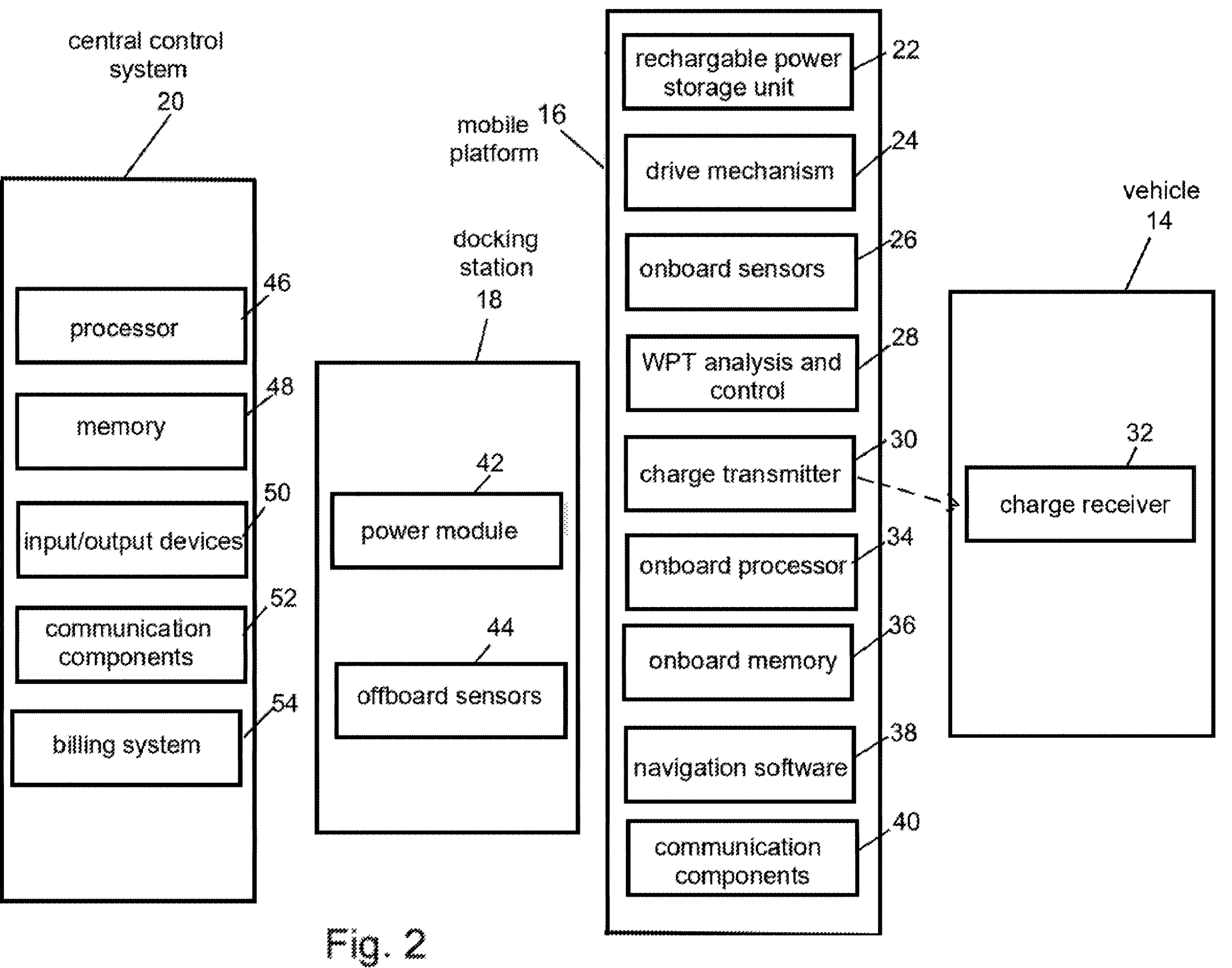
FIG. 2 schematically shows the main components of each of the basic elements of the entire WPT system.

FIG. 2 schematically shows the main components of each of the basic elements of the entire WPT system.

The WPT type used in the system, which depends on energy transmission represented symbolically between a charge transmitter 30 on the mobile platform 16 and a charge receiver 32 on electric vehicle 14. For inductive energy transfer, which is based on magnetic field coupling, charge transmitter 30 is comprised of transmitting conducting coils and charge receiver 32 comprises receiving conductive coils on the underside of the EV14. For capacitive energy transfer, which is based on electric field coupling, charge transmitter 30 comprises a transmitting plate on the mobile platform 16 and charge receiver 32 comprises a receiving plate on the underside of the EV 14. The components of both the mobile platform 16 and the EV 14 necessary for WPT between them are all compliant with international standards, e.g. SAE J2954 and SAE J2846/7.

A WPT analysis and control unit 28 comprises electric circuitry and software in an onboard processor 34 configured to utilize information from onboard sensors 26 and other information such as feedback from circuitry and sensors associated with charge receiver 32 to initiate and optimize WPT from rechargeable power storage unit 22 via charge transmitter 30 to charge receiver 32.

It is to be noted that in embodiments some or all processes of the WPT analysis and control unit 28 may be executed externally to the mobile platform 16 for example in the central control system 20.

The mobile platform 16 comprises a rechargeable power storage unit 22, e.g. one or more batteries, to supply energy for WPT to an EV 14; to supply to other components on mobile platform 16, e.g. onboard sensors 26; and to supply energy to a drive mechanism 24 configured to propel and steer mobile platform 16. Drive mechanism 24 comprises independently controlled drive chains configured to power omni or Mechanum wheels configured to propel mobile platform 16 to move it on the floor of the parking lot 10. The mobile platform 16 also comprises an onboard memory 36 that, inter alia, records details of assignments that the mobile platform 16 has executed. In embodiments of the mobile platform 16, navigation software 38, which is associated with onboard processor 34, is responsible for controlling the drive mechanism 24 to steer the mobile platform 16 on the available most energy efficient route to and from the EV 14. In addition mobile platform 16 comprises communication components 40 that allow two way wireless communication between components on mobile platform 16, and components of other entities in the parking lot 10, i.e. EVs 14, charging stations 18, other mobile platforms 16, and central control system 20 via, for example a LAN or Bluetooth network.

The rechargeable power storage unit 22 on the mobile platform 16 is charged in the charging station 18 by means of electric power from an electricity grid. The charging station 18 comprises one or more power modules 42. In a non-limiting embodiment, power modules 42 comprise electricity sockets on one of its walls connected to a power grid. Power module 42 also comprises electrical circuitry and other components to control and monitor transfer of electricity to rechargeable power storage unit 22, to automatically stop energy transfer when rechargeable power storage unit 22 are charged to maximum capacity, and for other purposes. In the embodiment described above, prongs configured to be compatible with slots in the electric socket protrude from the front or back of the mobile platform 16. When the mobile platform 16 returns to a charging station 18 after completing a mission, it slowly approaches the electricity socket and the prongs on the mobile platform 16 enter the slots in the socket and recharging of the rechargeable power storage unit 22 on the mobile platform begins automatically. In another embodiment the prongs may protrude from a wall of charging station 18 and the slots may be in a socket on the mobile platform 16. Alternatively, in other embodiments, charging station 18 and mobile platform 16 comprise components for wireless charging of rechargeable power storage unit 22. Transfer of electricity ends when the rechargeable power storage unit 22 on mobile platform 16 is fully charged or, on occasion if its rechargeable power storage unit 22 isn't fully charged, the mobile platform 16 is instructed to leave on another mission.

Depending on the size and expected demand for WPT charging, each parking lot may comprise one charging station 18 for each mobile platform 16, as shown in FIG. 1, or multiple mobile platforms 16 may be serviced by each charging station 18. In the latter case, if no mission is assigned to it, the fully recharged mobile platform 16 may be instructed to move out of the charging station 18 to allow another mobile platform 16 to enter and recharge its power storage unit 22. Typically, the rate of charging the power storage unit 22 on mobile platform 16 is about 50% of the rate at which the mobile platform 16 charges the EV 14. So, while one mobile platform 16 is charging an EV 14, two others are being charged. As written above, on average three mobile platforms 16 will be able to perform the charging of one EV 14.

In embodiments of the WPT system power module 42 also comprises communication components that are configured for two-way wireless communication between mobile platforms 16 and central control system 20. In FIG. 2, off-board sensors 44 are shown grouped together as located in charging station 18, but these may be located at any place in the parking lot 10, e.g. cameras can be attached to walls of indoor parking lots or mounted on posts in outdoor lots to keep overall surveillance on activities in the parking lot 10 or to aid in navigating a mobile platform 16 back and forth between a charging station 18 and an EV14 that is parked in the parking lot 10.

The central controlling system 20 comprises communication components 52 configured to allow two-way communication with the charging stations 18 and mobile platforms 16 under its control and outside entities such as: customers and/or their vehicles 14, the central controlling systems of other parking lots the employ the WPT system, and a central office of the company that has overall responsibility for all parking lots employing the WPT system described herein. Central controlling system 20 also comprises at least one computer or processor 46 and associated memory device 48. Processor 46 is programmed with dedicated computer software containing one or more programs written to perform particular functions related to operations of the WPT system. In some embodiments, data relating to charging sequences are stored in memory 48 for ongoing or post-charging analysis. In embodiments of the WPT system input/output devices 50, e.g. a keyboard, computer screen, or touchscreen, are available for manually entering instructions or information into the computer or processor 46 or the memory or displaying information related to operation of the system.

In some embodiments, processor 46 of the WPT system comprises artificial intelligence functionalities and employs machine learning models for updating the dedicated computer programs that control the system to continually improve all aspects of the service provided to the client from scheduling to billing and operation of the system, e.g. assigning tasks to mobile platforms 16 and alignment of charge transmitters 30 with charge receivers 32.

A single central controlling system 20 can be configured to handle more than one parking lot, for example in a multi-story parking lot or multiple parking lots. This will allow optimization of the use of the available mobile platforms to meet customer needs, for example by redirecting a customer from his normal parking lot to a different one where his time constraint can be accommodated. In embodiments system 20 can be handled by components in one or more of the charging stations 18 or on one or more of the mobile platforms 16 in the parking lot. In embodiments of the WPT system, the central control system comprises a billing system, i.e. software in processor 46 that compiles information received from the WPT analysis and control unit 28 to prepare and send either billing information, for example on a monthly basis, to an office outside of the parking lot 10 or to send an invoice directly to the customers.

In some embodiments, the mobile platform 16 is configured such that elements of the mobile platform 16, e.g., the charge transmitter 30 or the rechargeable power storage unit 22, are non-removably embedded in a housing of the mobile platform 16. The term "non-removably embedded" relates to a configuration in which one or more elements of the mobile platform 16 are, by design, not intended to be removed from the mobile platform without, for example, damaging or otherwise compromising the structural and/or functional integrity of, for example, the mobile platform 16 and/or the charge transmitter 30 and/or the rechargeable power storage unit 22. In some embodiments, the WPT system comprises an alarm subsystem and/or at least one camera configured to detect and/or record attempts to forcefully gain access to and/or remove one or more elements of the mobile platform 16 and to provide an alarm and/or visual output.

In some embodiments of the WPT system a camera and image processing software read the license plate number when a vehicle 14 enters parking lot 10. The number is then used by billing system 54 for automated user identification and billing purposes.

It is to be understood that, despite what is shown in FIGS. 1 and 2, different components of the systems can be located in other places. For example there may not be a central control system 20 in a particular parking lot 10. In this embodiment all functions of the central control system 20 and its components shown in FIG. 2 are located in one of the charging stations 18. In another embodiment, some of the components of the mobile platform 16 and/or their functions may be located and/or carried out by other components in the central control system 20 or a charging station 18. For example, some or all of the functions and components of WPT analysis and control unit 28 are located in a charging station 18, which receives information from onboard sensors 26 and charge receiver 32. Processor 46 analyzes this information and, via communication components 52, sends instructions to mobile platform 16 to adjust its position and/or orientation relative to EV 14 and/or to increase/decrease output from charge transmitter 30 in order to optimize WPT.

The main tasks of the central controlling system 20 are to schedule the charging operations based on the expected time of arrival (ETA) and charging requirements of customer's vehicles and assigning tasks to available mobile platforms 16.

In some embodiments, the charge transmitter 30 of the mobile platform 16 is configured to be moved upwards relative to the mobile platform 16 and/or the charge receiver of the EV 14 is configured to be moved downwards relative to the vehicle 14 for additional wireless power transfer optimization. This allows for differences in the clearance between floor surface and the bottom of the chassis of the EV 14 and allows a mobile platform 16 to be able to charge batteries of all types of electric vehicles, e.g. private sedans, RVs, minivans, pickup trucks, delivery vans, ambulances, and commercial trucks.

Figure 3:
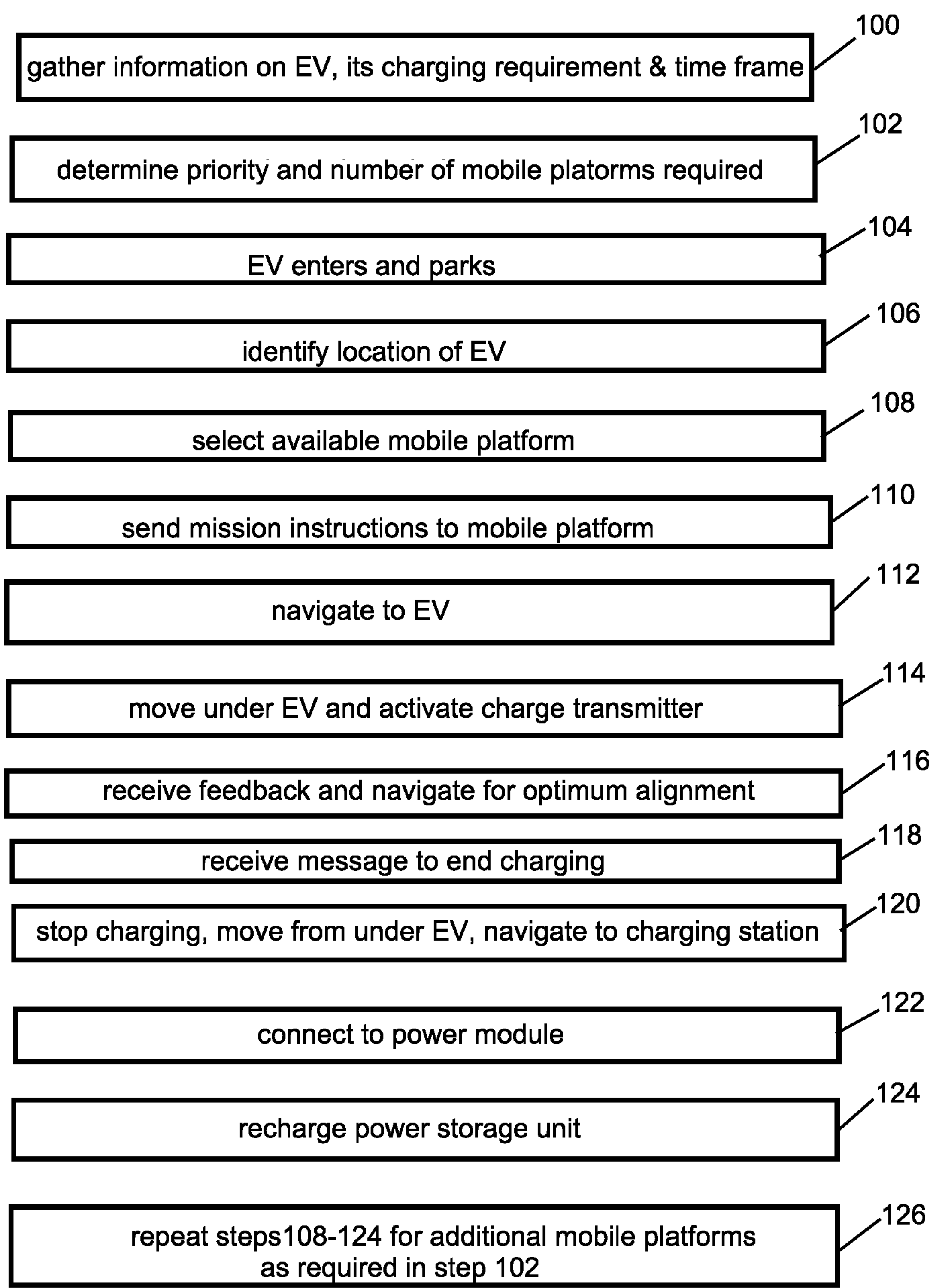
FIG. 3 is a flow chart outlining the steps of a method for using the WPT system described herein.

FIG. 3 is a flow chart outlining the steps of a method for using the WPT system described herein.

a) 100—gather information on the EV, its charging requirement, and the time frame for providing the service.

This step can be executed in many ways either before the EV 14 arrives at the parking lot 10 or, as described below in connection with step 104, at the time of arrival. One of the main advantages of the system is that it utilizes dedicated computer programs and artificial intelligence to enable it to optimize efficiency "on the fly" without advanced knowledge of the arrival and requirements of a vehicle that requires charging. Although the system has this advanced capability, an efficient and simple way of receiving service is for the customer to provide advanced notice. One way of doing this is for the customer to have either a fixed day and time for an appointment and then to give the system permission for the central controlling system 20 to connect directly with the computer and navigation application of the vehicle 14 before the expected time of arrival in order to obtain more accurate estimates of the time of arrival and energy requirements that are needed to provide efficient service promptly on arrival. Third party sources, e.g. Waze and Pango, may provide information about arrival time and information about battery charge state may come from the computer of vehicle 14 to the central controlling system 20 via the customer's smart phone.

For privacy reasons, the computer software programs can be written to only access specific information from the vehicle. If desired, the customer can choose not to allow access to the computer of their EV 14. In this case, in order to be sure of receiving the WPT charging service within a desired time slot, the customer will provide all of the necessary information using an application on their cell phone.

In the case of unscheduled arrival, the driver will be able to remotely order the service using an application on their cellphone. In some embodiments of the system, a touch screen or other input device located in the parking lot 10 is configured to provide the central controlling system 20 with the charging state of the battery of the EV14 and the amount of time that the vehicle 14 will remain parked in the parking lot 10. With this information the central controlling system 20 can make adjustments to fit the new mission into the work schedule.

There follows examples of just a few of the many different scenarios in which the system can interact with a customer to provide a WPT charging service:

According to a fixed schedule: An office worker parks in the basement of the office building in which she works five days a week from 08:00 to 16:00. She signs a service contract to have her EV 14 charged on a fixed schedule on Monday and Thursday of each week. The exact time of charging is not important as long as the vehicle 14 is fully charged when she is ready to leave work.

According to the state of charge of the battery of the EV 14: An office worker parks in the basement of the office building in which she works five days a week from 08:00 to 16:00. On entering the parking lot each morning, she uses an application on her cell phone to report the charge status of her EV 14 to the central controlling system 20. Optionally, by prior agreement with the owner, the computer in the central controlling system 20 connects to the computer of the EV 14 and reads the charge status of the vehicle to determine if charging is required.

A customer who only infrequently parks in the specific parking lot 10 contacts the central controlling system 20 and reports that he will be in the area for about 4 hours the next morning and would like to park and receive WPT service for his EV 14 while he attends a meeting in the area of the parking lot 10. In this case, on the morning of his arrival, after prearranged permission of the customer, the central controlling system 20 connects directly to the navigation application in the EV 14 to determine the expected time of arrival at the parking lot 10 and also connects directly to the computer of the EV 14 to learn the status of the battery of the EV 14. With this information a suitable mobile platform 16 can be on standby to locate the vehicle 10 and travel towards it to begin the WPT procedure immediately on the arrival of the EV 14 at the entrance 12 of the parking lot 10.

A restaurant that enables its customers while making a reservation, to get also a parking and a charging of their cars, while dining; this can work for a range of establishments, such as movie theatres, education establishments, etc.

b) 102—determine priority and number of mobile platforms required

This step is carried out by the processor 46 in the central control system 20. The priority list is continually updated as new information is received and new EVs 14 enter the parking lot 10. Information relevant to determining the priority list includes, but is not limited to, the number of EVs 14 to be serviced relative to the number of available mobile platforms 16, the expected time of arrival of each EV 14, the state of charge of the batteries on the EV 14 (which determines the length of time needed for charging the EV 14 and the number of mobile vehicles 16 required to provide the required energy to charge the EV 14), and the expected time frame within which the EV 14 will be in the parking lot 10. In embodiments of the system, the opportunity for human intervention is allowed in certain situations, e.g. to change the scheduling priority of a vehicle or to manually connect a mobile platform 16 to a power source to recharge its power storage unit 22 in a charging station 18.

c) 104—the EV 14 enters the parking lot 10 and parks

Once a scheduled or randomly arriving EV 14 that requires the WPS battery charging service enters the parking lot 10 the driver parks the vehicle and the WPT system identifies and determines the exact location of the vehicle 14 and activates an available mobile platform 16 beginning a multi-step process in which the mobile platform 16 travels automatically to the location of the EV 14, locates the charge receiver 32 on the EV, aligns the charge transmitter 30 and charge receiver 32 for optimal charge transfer, completes the charge transfer, and ends the mission by returning to a charging station 18.

d) 106—identify the location of the EV 14 in the parking lot 10

When entering the parking lot 10, the driver may park his vehicle 14 in a parking space that has been reserved for him, e.g. an executive in a factory parking lot or a tenant in a parking lot of an apartment house; but, in general the driver can park in any available space and the central control system 20 is configures to identify and find the exact location of the EV 14 in the parking lot 10.

The location of the EV 14 in the parking lot is detected and transferred to the processor 46 in the central control system 20 of the WPT system by off-board sensors 44, e.g. Bluetooth, RFID, or weight sensors, or video cameras that track the movements of the EV 14 after it enters the parking lot 10. In order to allow a mobile platform 16 to navigate to the exact location of a parked vehicle 14 in the parking lot 10 the processor 46 must be able to provide the mobile platform 16 with directions or coordinates in a coordinate system. In some embodiments the coordinates are provided in a world reference frame, in other embodiments the coordinates may be provided in a space-based global navigation satellite system (GNSS) such as the US-operated Global Positioning System (GPS) and/or the Russian-operated Global Navigation Satellite System (GLONASS). In some embodiments, GPS-free based navigation systems, such as internal maps stored in onboard processor 34 or optical or RFID markers distributed throughout the parking lot 10 and detected by onboard sensors 26, are employed e) 108—select available mobile platform 16

Based on the identified vehicle type and/or model, the processor 46 is able to determine whether the charge receiver 32 on the EV 14 is compatible with the international standards of the charge transmitter on one or more of the mobile platforms 16 in the parking lot. Other useful information, e.g. the amount of clearance under the charge receiver 32 on the bottom of the EV, is also learned from the identified vehicle type and/or model. Based on this information, and information on the location and charge status of the rechargeable power storage unit 22 on all mobile platforms 16, the processor 46 of the WPT system selects the most suitable mobile platform 16 for the charging mission and initiates either an immediate or delayed wireless charging sequence depending on the overall demand on the system and time that the vehicle 14 will remain in the parking lot 10.

Initiation of a charging sequence begins with assigning the charging task to a suitable mobile platform 16. A suitable mobile platform 16 is one that has a charge transmitter 30 that conforms to the same standards as the charge receiver 32 on EV 14 to be charged, that is not presently engaged, and whose onboard rechargeable power storage unit 22 is sufficiently charged to carry out the assignment. It is noted that the mobile platform 16 does not have to be in a charging station 18 at the beginning of an assignment. In some cases the mobile platform may be returning from a completed assignment and, if its rechargeable power storage unit 22 retains sufficient charge, be rerouted to carry out the new assignment. In other instances, if all mobile platforms are engaged and it is very urgent to recharge a newly arrived EV 14, then processor 46 can instruct one of the mobile platforms 16, to stop recharging a vehicle before its batteries are fully charged and to navigate to the newly arrive EV 14 and to begin charging its batteries. The same or a different mobile platform 16 will be sent at a later time to complete charging the first EV 14.

f) 110—send mission instructions to mobile platform 16

Once the processor 46 has determined the position and orientation of the charge receiver 32 on the EV 14, The processor 46 uses communication components 52 to communicate this information and other information that might be helpful to identifying and locating the EV 14 to the navigation software 38 in the onboard processor 34 via onboard communication components 40 of the selected mobile platform 16.

Other useful information is provided by the off-board sensors 44, which are configured to provide processor 46 of the central control system with information that enables it to detect and identify a type and/or model or color of a vehicle 14 that enters the parking lot 10. The vehicle's type and model are used to provide the mobile platform 16 with the corresponding charge receiver 32 configuration including the charge receiver's exact position and orientation in the vehicle 14. If the vehicle 14 belongs to a repeat user of the WPT charging service, then memory 48 comprises the vehicle type and/or model. If data related to the vehicle 14 has not previously been entered in memory 48, then various methods can be employed to identify its type and/or model. These methods include, for example, comparing images of the vehicle 14 with databases either stored internally in memory 48 or external databases contacted by means of communication components 52. Another example is to have the user of the vehicle to supply the required information remotely via an application on their cell phone or manually in the parking lot 10 using input device 50.

g) 112—navigate to the EV

Once the required information is received by the mobile platform 16 various onboard sensors 24 are utilized for navigating the mobile platform 16 to reach the location of the vehicle 14 and for autonomously steering or navigating the mobile platform underneath the vehicle 14. Onboard sensors 26 utilized for navigating the mobile platform 16 to reach the position and orientation relative to the EV 14 for optimal charging include inertial and/or non-inertial sensors.

Suitable inertial sensors include, for example, one or more accelerometers and/or gyroscopes. Suitable non-inertial sensors include, for example, one or more barometers, proximity sensors, altimeters, magnetometers, light sensors, cameras, wireless receivers including, for example, RFID, Bluetooth receivers, and/or receivers of GPS or GLONASS signals.

In an embodiment onboard memory 36 and/or navigation software 38 contains a detailed map of the parking lot 10 that allows the mobile platform 16 to travel using dead reckoning with the aid of visual information provided by one or more cameras on the platform or by sensing optical, Bluetooth, or RFID signals generated from transmitters located at various locations in the parking lot 10.

In some embodiments, the onboard sensors 26 are employed for object detection, i.e. to detect objects that may hinder the mobile platform's approach to the optimal charging position and orientation relative to the vehicle whose battery is to be charged. When an obstacle is detected, inter alia, one or more of the following may be automatically initiated: a) a warning output may be provided; b) the charging mission may be aborted and the mobile platform may be halted at its present position; and c) the charging mission may be aborted and the mobile platform may navigate back to the initial starting point.

Since using the system described herein, the vehicle 14 containing the battery to be charged remains stationary while the mobile platform 16 navigates to reach the charging position and orientation (P&O) of the charge receiver 32, of the EV 14 in the parking lot 10 relative to the mobile platform 16 before commencing platform navigation of the mobile platform 16 towards the charging P&O is not of concern, as long as the P&O of the EV 16 is within the travel distance limit of the mobile platform 16. Thus, although the WPT system is described herein as being operable within the confines of parking lots 10, in some embodiments mobile platforms 16 can be programmed to leave the confines of a parking lot 10 to recharge an EV 14 parked on the street outside.

h) 114—move under EV 14 and activate charge transmitter 30

After the mobile platform 16 has reached the EV 14 the mobile platform 16 moves under the chassis of the EV 14, the WPT analysis and control unit 28 activates charge transmitter 30 to begin transmitting in the direction of the charge receiver 32. This is the beginning of a process begins for aligning the position and orientation (P&O) of the charge transmitter 30 with the P&O of the charge receiver 32 for autonomously charging the vehicle battery. This process will now be discussed in general for inductive WPT and the actual process used by the presently described system will be described in detail herein below. Capacitive WPT is carried out, mutatis mutandis, in a similar way.

i) 116—receive feedback and navigate for optimum alignment

The P&O of the charge receiver 32 is defined by one or more wireless charge parameter values based on which the WPT system may determine whether one or more wireless charge criteria are met. When the selected criteria are met, then alignment for optimal energy transfer is achieved. For instance the wireless charge criteria relate to one or more inductive charging characteristics such as, for example, magnetic field characteristics, e.g. magnetic field strength, direction, rate of change or frequency at the charge receiver 32; a voltage difference generated by the charge receiver 32; a charge current generated by the charge receiver 32. In some embodiments, the wireless charge criteria may pertain to a threshold value i.e. above or below a value of the selected criteria.

The WPT system can determine that the charging P&O is reached based on the measurement of one or more near-field WPT charging characteristics (e.g., magnetic field characteristics including magnetic field direction, strength, or relative change) at a particular location by one or more sensors associated with charge receiver 32 on the EV 14. For example, one or more Hall or other types of sensors is employed to measure the magnetic field strength to which the charge receiver 32 is subjected and other components of the EV 14 communicate this information to communication components 40 on mobile platform 16 to. navigate the mobile platform 16 to the charging P&O based on the sensed magnetic field characteristic (e.g., field strength) at the charge receiver 32 to optimize (e.g., maximize) the power transfer. In some examples, sensors may be employed for measuring the strength and/or direction of stray magnetic fields, which may vary depending on the degree of alignment or misalignment between the charge transmitter 30 and charge receiver 32.

The one or more wireless charging criteria may allow for a permissible margin of error, for example, with respect to the alignment of the P&O of the charge transmitter 30 relative to the P&O of the charge receiver 32; with respect to a desired magnetic field characteristic values, a desired voltage; a desired current generated by the charge receiver; and/or the like. For example, even though the charge transmitter 30 and receiver 32 are not perfectly aligned with each other in terms of their corresponding P&O values; the wireless charging process may nevertheless be initiated while, at the same, (e.g., continuously or repeatedly) trying to increase power transfer efficiency through charge transmitter 30 and/or (a main) receiver 32 coil and/or P&O adjustment, for example, based on measuring magnetic field characteristics. In some embodiments, the charge receiver 30 may include, in addition to a main receiver coil, auxiliary receiver coils to inductively charge the vehicle's battery using frequencies which are outside the main receiver coil's resonant frequency.

In some embodiments wireless charge parameter values are sensed by sensors on the vehicle 14, which may then provide a sensor output as feedback to the mobile platform 16. The WPT analysis and control unit 28 on mobile platform 16 is configured to determine whether at least one wireless charging criterion is met. When the at least one wireless charging criterion is not met, the current charging P&O of the mobile platform 16 is updated to arrive at a new charging P&O at which the at least one wireless charging criterion is met. The above processes of determining whether a wireless charging criterion is met may be repeatedly performed to optimize the WPT.

j) 118—receive message to end charging

A message to end charging may either be sent to charge transmitter 30 from several sources, e.g. the onboard processor 34 when the power in the rechargeable power storage unit 22 on the mobile platform 16 that is available for transmitting to an EV 14 has been consumed, the computer of the EV 14, when its batteries have been completely recharged or from central control system 20 if the mobile platform 16 is urgently needed to provide high priority charging service to a different EV. In some cases initial instructions to the mobile platform 16 sent from the central control system 20 in Step 110 may be to stop activation of the charge transmitter after a fixed time period.

k)120 —stop charging, move out from under EV 14, and navigate back to charging station 18

After receiving a stop message in step 118, activation of charge transmitter 30 ceases and the mobile platform 16 navigates out from under the EV 14 and back to a charging station 18. The mobile platform 16 can return to either the charging station 18 from which it originally started the mission or to another one depending on availability. The mobile platform 16 can use any of the navigation methods and aids described in relation to Step 112 in order to return to a charging station.

l) 122—connect to a power module 42

Mobile platform 16 receives a message from central control system 20 about the closest charging station 18 that has an available power module 42. Alternatively, in some embodiments of the system mobile platform 16 communicates directly with charging stations 18 in order to learn of an available power module 42. In some cases all power modules 42 in the system may be engaged in charging other mobile platforms 16. In this case a mobile platform 16 returning from a mission will have to wait for a power module 42 to become available. In any case, as soon as the mobile platform 16 arrives at a charging station 18 having an available power module 42, the mobile platform 16 automatically makes an electrical connection with the power module 42, for wired or wireless charging of rechargeable power storage unit 22 as described herein above.

m) 124—recharge power storage unit 22

As soon as the mobile platform 16 connects to a power module 42, circuitry in the power module automatically begins transferring electricity from a power grid to charge rechargeable power storage unit 22 and to monitor its state of charge. As soon as the power module determines that power storage unit 22 is fully charged, electricity transfer from the power grid ceases and mobile platform 16 is ready to leave on its next mission. If there is a need to make the power module 42 available for another mobile platform 16, then the fully charged mobile platform 16 disconnects from the power module 42 and travels to a holding area in charging station 18 or at some other location.

In some situations central control system 20, which is continuously updated on the charge status of rechargeable power storage unit 22, instructs power module 42 to stop the charging operation and mobile platform 16 to either make room for another incoming mobile platform 16 or to set out on a new mission that doesn't require a fully charged power storage unit 22.

n) 126—repeat steps 108-124

As described herein above the quantity of energy in kWh that the rechargeable power storage unit 22 on each mobile platform 16 is able to bring to the EV 14 is much less than that of the capacity of the batteries on the EV. Therefore, in step 102 the processor 46 in the central control system 20 determines how many mobile platforms 16 will have to be dispatched in order to complete the mission based on the received information regarding the status of the charge on the batteries in the EV, the time available for servicing the vehicle, and instructions from the driver whether he requires a full or partial charge. Once the first mobile platform 16 has transferred all available power from its power storage unit 22 to EV 14, then a second mobile platform 16 is dispatched and if necessary the process is repeated for a third mobile platform, etc. The frequency with which successive mobile platforms 16 are sent to charge a specific EV 14 depends primarily on the amount of time in which the EV 14 will be in the parking lot 10. For example, if the time is relatively short compared to total charging time required, each successive mobile platform 16 will be dispatched to arrive at the location of the vehicle just as the previous mobile platform moves out from under and away from EV 14. If the EV 14 will be in the parking lot for several hours, then successive mobile platforms 16 can be dispatched to the same EV 14 at longer intervals in accordance with the priority list for charging other vehicles.

It is to be noted that the method of using the system shown in FIGS. 1 and 2 has been parsed into a series of individual steps as shown in FIG. 3 and described above for ease and clarity in presenting the essential features of the method. In practice, there can be considerable overlap and interchanging of portions of the activities assigned to particular steps. For example, part of the information needed in Steps 100 and 102 and examples of methods used to attain it are described in connection with step 104 and information need for step 112 and methods for obtaining it are described in relation to step 106.

Alignment Procedure

The following is a detailed description of the method used in the system described herein above in step I (116) for alignment of the charge transmitter 30 on mobile platform 16 and charge receiver 32 on EV 14.

First is presented a background discussion, which will be useful in understanding WPT technology.

The prevalent wireless power transfer (WPT) technologies are inductive coupling and magnetic resonant coupling [1]. Inductive coupling is a technique commonly used in wireless charging applications, however its range of operation is limited to very short distances. Magnetic resonant coupling [4] is a WPT technique where power is inductively transferred from a primary (transmitting) coil to a secondary (receiving) coil under resonant conditions and whose range of operation can reach longer distances, and therefore is suitable for electric vehicle (EV) charging applications.

The correct alignment between the primary coil and the secondary coil critically affects the capability of a WPT system to efficiently transfer power. Currently there exist many standards related to WPT implementation. SAE J2954/1/2 addresses issues related to alignment method, interoperability, frequency of operation and power level [2].

The coil system, one of the crucial factors in designing a wireless charging system, is mostly designed in pad form. Several coil shapes are proposed in the literature. Circular and rectangular shapes are the most common structures used in EV chargers due to their simplicity. However, many other structures such as Hexagonal and DD coil structures have been proposed [1]. Moreover, although SAE TIR J2954 establishes a common coil operating frequency band using 85 kHz (81.39-90 kHz) for all light duty vehicle systems, other frequencies in the range 20-100 kHz are possible [7]. In summary the coil systems may assume a large variety of forms, each with its peculiar properties and behavior.

The prevalent wireless power transfer (WPT) technologies are inductive coupling and magnetic resonant coupling [1]. Inductive coupling is a technique commonly used in wireless charging applications; however its range of operation is limited to very short distances. Magnetic resonant coupling [4] is a WPT technique where power is inductively transferred from a primary (transmitting) coil to a secondary (receiving) coil under resonant conditions and whose range of operation can reach longer distances, and therefore is suitable for electric vehicle (EV) charging applications.

The correct alignment between the primary coil and the secondary coil critically affects the capability of a WPT system to efficiently transfer power. Currently there exist many standards related to WPT implementation. SAE J2954/1,/2 addresses issues related to alignment method, interoperability, frequency of operation and power level [2].

Figure 4:
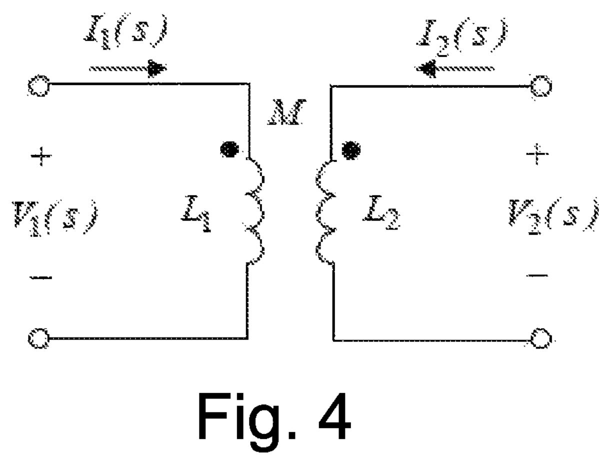
FIG. 4 is a diagram showing how the primary-secondary coil system can be seen as a transformer-like coupling network.

Regardless of the way the coils have been implemented, and regardless of the operating frequency, the primary-secondary coil system can be seen as a transformer-like coupling network [5] as described in FIG. 4, where $L_1$ and $L_2$ are the primary and secondary self-inductances respectively, and M is the mutual inductance. The coupling network of FIG. 4 may be completely described in terms of its terminal equations in Laplace domain.

$$\begin{cases} V_1(s) = sL_1I_1(s) + sMI_2(s) \\ V_2(s) = sMI_1(s) + sL_2I_2(s) \end{cases} \quad (1)$$

Figure 5:
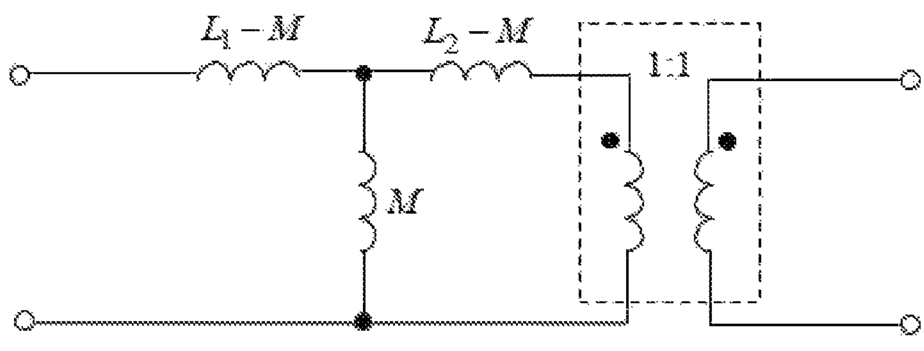
FIG. 5 shows a T-shaped network topology that is frequently used in WPT analysis.

Several network topologies have the same defining equations (1) as the network in FIG. 4, and therefore they are completely equivalent. One in particular, frequently used in WPT analysis, such as in FIG. 8 of [2] and in FIG. 6 of [3], is T-shaped and has the form shown herein in FIG. 5.

Figure 6:
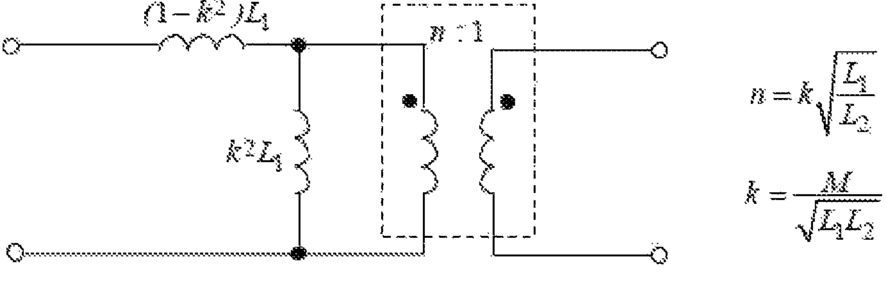
FIG. 6 shows an L-shaped network topology that is useful for analyzing coupled networks.

Another equivalent form that is very useful for analyzing coupled networks, is L-shaped [5] and is shown herein in FIG. 6, where $0 \leq k \leq 1$ is referred to as the coupling coefficient. The rectangle whose sides are the dashed lines represents an ideal transformer.

Figure 7:
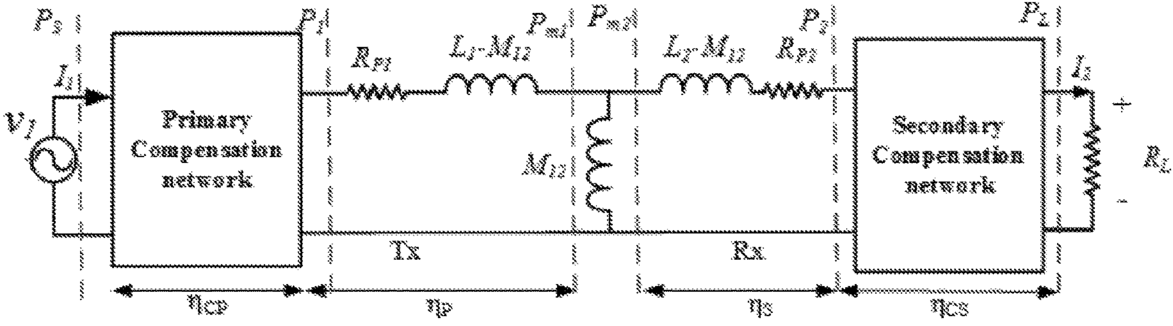
FIG. 7 shows a coupling network having compensating networks connected to both the primary and secondary ports.
Figure 8:
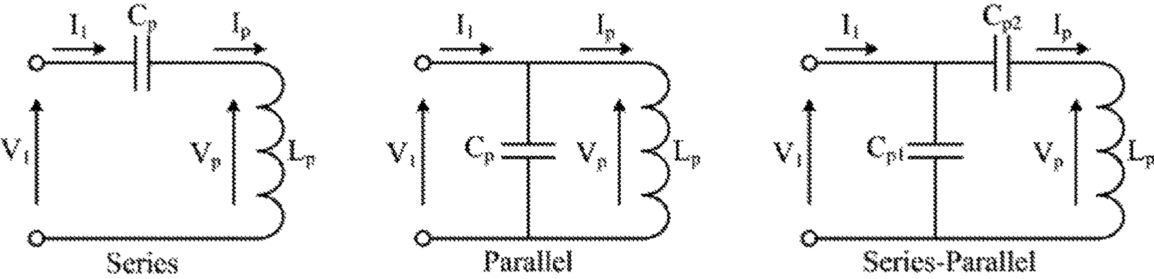
FIG. 8 shows several major primary compensating topologies.

In order to efficiently transfer power, the coupling network must be operated under resonant conditions. Therefore compensating (tuning) networks are connected to both the primary and the secondary ports, as shown in FIG. 8 of [2], which is reproduced herein in FIG. 7 for convenience.

The compensation networks may have many different shapes and behaviors. The major primary tuning topologies are described in FIG. 4 of [3], which is reproduced herein in FIG. 8 for convenience. If the secondary coil has been compensated by the EV manufacturer to reflect a real-valued load at the operating frequency then, only the primary coil remains to be tuned by the manufacturer of the charging equipment.

The compensating networks are needed in order to minimize the VA rating of the power supply, and reduce the reactive (imaginary) power that negatively affects system efficiency, and also in order to maximize the real power transfer to the load reflected from the secondary coil. The matching is a critical issue, as the maximal real power transfer to load occurs when the power supply is matched to the reflected load impedance. The explanation why impedance matching maximizes the real power transfer is given in the section labelled "Impedance Matching Maximation" herein below.

From the above, it follows that the real power transfer depends on many factors, including the type and shape of the coils, the operating frequency, the type of compensation, and the source and load impedances. However, once the hardware has been defined and the system has been implemented, the major remaining factor that determines the performance of the power transfer will be the alignment between the primary and the secondary coils, since the alignment determines the coupling coefficient $0 \le k \le 1$. Indeed, looking at FIG. 6, is evident that the coupling coefficient strongly affects the power transfer. For instance, if k is substantially smaller than unity, the power source will see a large serial inductance, and the primary transformer input will be nearly shorted by a small inductance (thus resulting in a substantial voltage drop), while, if k equals unity, the source appears directly on the reflected load.

In order to perform an efficient coil alignment process, one needs to define a figure of merit (a cost function) that indicates the quality of the alignment. For instance, during the alignment process, if the ohmic losses and the core losses of the coils are negligible, as the coupling coefficient increases, the real power delivered by the source to the primary coil will increase, because the primary coil will deliver more real power to the load. The increase in real power may be detected, for instance, by monitoring the current flowing into the primary coil by means of a Hall sensor (for example model CS-45AL by Panucatt Devices LLC of Irvine, California, USA) and the voltage across the primary coil by "sniffing" or by adding a step-down sampling coil winding tightly coupled with the primary coil, and then by computing the phase difference between voltage and current. If the compensating tuning networks operate properly, the better the coil alignment, the more real power is delivered, and the more the above phase difference approaches zero. Thus, for instance, a cost function may be defined that is proportional to the real power delivered to the primary coil. The explanation why and how a smaller phase difference between voltage and current yields more real power transfer is given herein below in The section labelled "Relation Between Phase Difference And Real Power Transfer".

For different systems, depending on the design of the coils and of the compensating networks, the cost function may turn out to be of different shape, but as long as it has one global maximum corresponding to the best alignment, an efficient aligning algorithm can be defined, which leads itself to an optimal coil alignment. A suitable measurable cost function with a global maximum has been shown in preliminary proof of concept experiments by the inventor of the WPT system to exist in his coil system under development.

The following is a description of a general efficient alignment approach that does not require any specific knowledge of the cost function, but only assumes that the cost function can be monitored and a measurement proportional to it can be obtained. The approach also assumes that the cost function has a global maximum (or minimum) corresponding to the optimal alignment point.

The proposed approach assumes that, regardless of the type of WPT coils used, it is possible to define a cost function to be maximized (or minimized), such as, for example, measuring the real power delivered by the power source to the transmitting coil, and thus delivered to the receiving coil (or a cost function to be minimized, such as measuring the ratio of the reactive power to the real power, thus estimating system efficiency).

For instance, such a cost function might possibly be derived from the billing system that should measure (for billing purposes) the real power (and thus the energy) delivered to the customer, or may be computed by direct measurement of the voltage and the current supplied to the transmitting coil, and by estimating the phase difference between the two.

Clearly the cost function will be dependent on the horizontal alignment of the coil mounted on the charging mobile platform 16 with respect to the coil mounted on the EV 14, and specifically, if the EV 14 is static, the cost function will be directly dependent on the physical location of the mobile platform 16 on the ground.

It is further assumed that the above cost function is bell-shaped so that it has an "optimal point", namely, has one global maximum (or minimum) that occurs for the optimal horizontal location of the mobile platform 16. In this case, the goal will be to bring the mobile platform 16 to the location that maximizes (minimizes) the cost function. As pointed out before, such a cost function with a global maximum has been shown by the inventor to exist in the coil system of the present invention. If in some system, instead of a unique optimal point, the cost function has more than one local maximum (minimum), aligning with a "locally optimal" point may still provide satisfactory performance. Note that there may be a unique case of multiple local maxim that have substantially similar (outcomes), and clearly such a case results in an optimal performance.

In order to perform the alignment procedure that is now described, it is crucial that the assumptions of the previous paragraph are true and that the mobile platform can move in X and Y directions and rotate around the coil's axis of symmetry. In the present system, the omnidirectional wheels of drive mechanism 24 allow the mobile platforms 16 to perform these movements.

In all that follows it is assumed that the charging mobile platform 16 is capable of moving in small displacements in two perpendicular directions, along the axes of a Cartesian coordinate system located on the mobile platform 16, at a position fixed with respect to the mobile platform 16 itself, and whose origin is at the center of the mobile platform 16. It is further assumed that the mobile platform 16 is also capable of spinning by any angle θ around the vertical axis passing through the center of symmetry of the transmitting coil mounted on it. In this manner, whenever a spin occurs, for each angle θ the small displacements above will always remain in fixed directions with respect to the mobile platform 16, while they will be in different directions with respect to the ground, but still, they will always be perpendicular to each other.

Now, it is assumed that, as a preliminary setup, the transmitting coil on charge transmitter 30 on the mobile platform 16 has been approximately aligned in a horizontal plane with respect to the receiving coil in charge receiver 32 on the EV 14 by guiding the mobile platform 16 under the EV 14 by external means such as, described herein above with respect to steps 112 and 114 and FIG. 3. Further it is assumed that the above rough alignment is correct enough so that at this point one is able to begin measuring, to some extent, the present value of the cost function. Now, depending on the geometry of the coils, whether circular, square, or other, it is assumed that the mobile platform 16 spins in-place by an angle θ until the geometry of the coils (the direction of the field) is aligned so that the cost function reaches a maximal value with respect to the spin angle, while the mobile platform 16 may be still very far from the optimal point in the horizontal plane (If the geometry of the coils is circular, spinning the mobile platform may not be needed).

At this point, the geometry of the primary coil is aligned with the geometry of the secondary coil, but the coils are not yet aligned in the horizontal plane, the mobile platform 16 is static, and temporarily the horizontal coordinate system on the ground is identified to coincide with the coordinate system on the mobile platform 16, with perpendicular x and y axes.

The task is now to determine a converging procedure to instruct the mobile platform 16 to take a series of movements or "jumps" which may be of variable lengths and variable directions in the horizontal plane, such that at each jump the cost function only increases (decreases) at the fastest possible rate for each jump. In this way we continuously move uphill (downhill) on the cost function, and guide the mobile platform 16 as close as possible to the optimal alignment point in the horizontal plane, with the minimal number of jumps possible. Moreover, the procedure must be such that, once the optimal horizontal alignment is reached, we don't diverge from it anymore, but we remain in its proximity for any subsequent jump. The "jumps" relate to two different movements, the one needed to calculate the gradient; and the one that gets the mobile platform closer to the optimal point. The former cannot be too small; otherwise there may be a problem in the calculation if the "noise" is too big in relation to the step. The latter cannot be too big as then we may go "over the hill" rather than reaching the optimal spot.

For non-circular coils, a spin may be required to realign the geometry of the coils between each two subsequent jumps, in which case, for each jump, the directions of the x and y axes of the coordinate system with respect to ground may be different.

The alignment process can be initiated at a weak charging level, so to prevent possible damages due to overvoltage or overcurrent, and should go on until a "stable state" is detected. A stable state may be declared when the detected value of the cost function does not change appreciably anymore following several additional jumps, thus indicating that the global maximum has been reached, or when the variance of the displacement over several additional jumps approaches zero, thus indicating that the mobile platform remains essentially static and close to one particular position. Once a stable state is declared, the alignment process may terminate, and the full charging may start. If in some system the cost function has several local maxima (minima), the procedure will guide the mobile platform to align to one of these maxima (minima), depending on the location where the procedure started. However, as pointed out before, still a "locally optimal" alignment might possibly provide satisfactory performance.

It should be noted that, in order to carry out a procedure such as the one described above, there is no need to accurately measure the cost function or the real power delivered to the transmitting coil, but it is only required to detect a value proportional to them.

The method chosen by the inventor is known as "Gradient Ascent (Descent)" [6], which is well suited for solving optimization problems that are concave (convex) in nature, namely, that have a global maximum (minimum). In the gradient ascent method, one takes a series of jumps in the horizontal plane, where the direction of each jump is determined by the gradient of the cost function, and the size of the jump may be optimized with respect to the shape of the cost function.

In the framework used herein, the gradient is a vector in the horizontal plane, which is known to point towards the horizontal direction that yields the local steepest ascent (the maximal local rate of increase) of the cost function, and whose norm (length) equals the rate of increase. As a consequence, by repeatedly jumping in the direction of the gradient, one continuously climbs, in subsequent steps and at the fastest possible speed, towards the maximum of the cost function, and therefore towards the optimal alignment point in the horizontal plane, It must be pointed out that the gradient points towards the direction of the local steepest ascent, which may vary depending of the location, and not towards the direction of the global maximum, therefore, the above jumps must be limited in size, in order not to "skip" the optimal location. If the shape of the cost function is known, the jump size may be optimized accordingly. The explanation why the gradient yields the horizontal direction corresponding to the steepest ascent of the cost function is given herein below in the section labelled "Relationship Between Gradient and Cost Function".

The central idea in using the gradient method with the WPT mobile platform 16 is the following: Assume that the center of symmetry of the primary coil coincides with the center of the mobile platform 16, and assume that the mobile platform 16 can spin by any angle θ around a vertical axis passing through its center. Moreover, assume that the mobile platform 16 can move on the horizontal plane in two perpendicular directions, namely in direction of its own right-left axis, which is denoted as the x-axis, and in direction of its own forward-backward axis, which is denoted as the y-axis, and the origin of the x-y coordinate system coincides with the center of the mobile platform 16. Clearly this x-y coordinate system moves along with the mobile platform 16, and therefore the origin and the direction of the x and y axes are fixed with respect to the mobile platform 16, but they change with respect to ground due to displacement and spinning of the mobile platform 16. As previously stated, it is emphasized that these are assumptions are correct for the mobile platforms of the system.

The unit vector in the right direction of the x-axis is denoted by i, and the unit vector in the forward direction of the y-axis is denoted by j. At the beginnings of each iteration, the horizontal coordinate system with respect to ground is taken to coincide with the horizontal coordinate system of the mobile platform 16, and held fixed until the next iteration begins.

As discussed before, it is assumed that, initially, the mobile platform 16 has been roughly aligned to the EV 14 in the horizontal plane by external guiding means, and the alignment is correct enough so that the value of the cost function begins to be detected to some extent.

Figure 9:
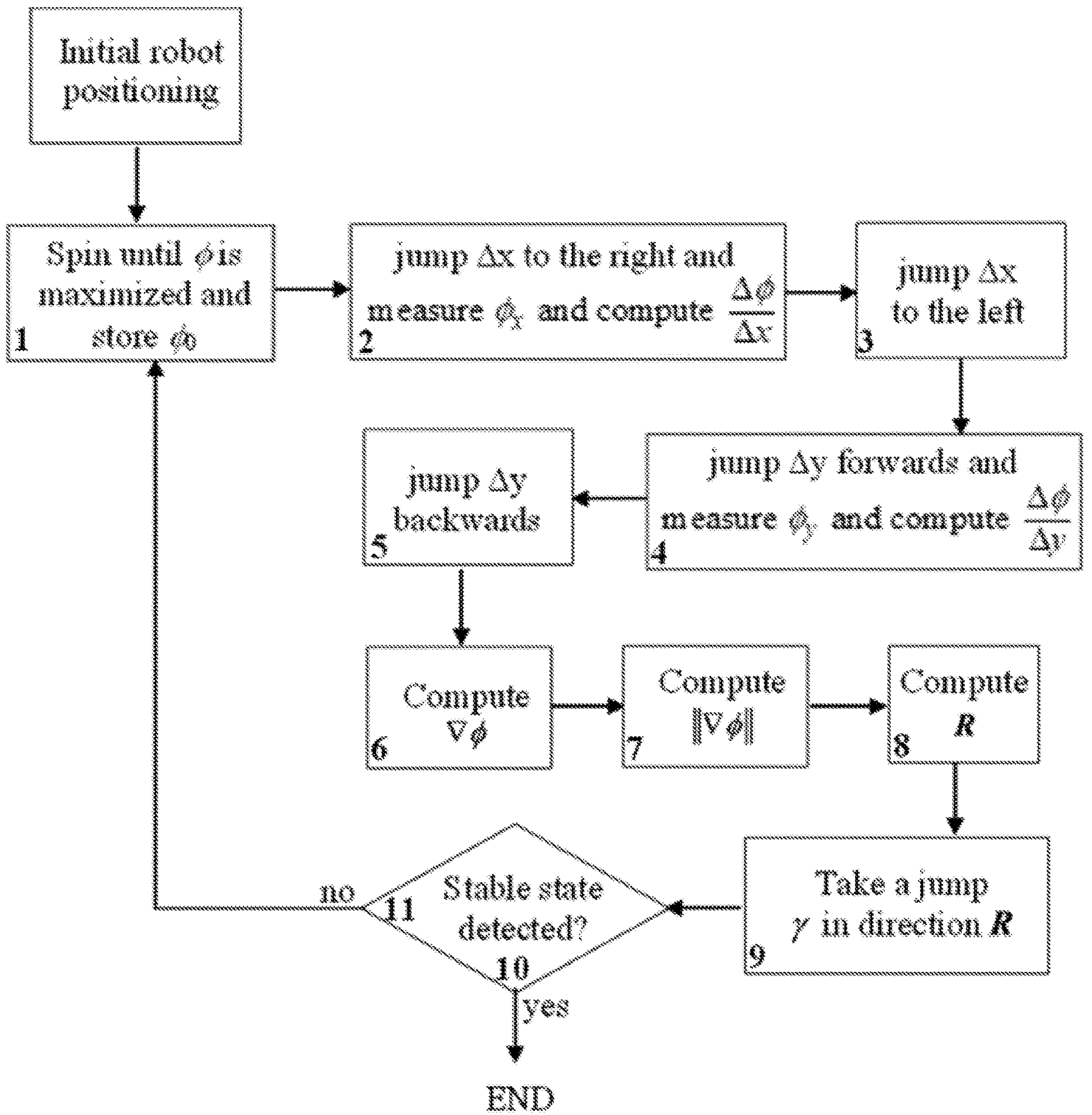
FIG. 9 is a flow chart summarizing the steps to be performed in order to reach the horizontal location that corresponds to the maximum of the cost function.

The steps of the algorithm to be performed in order to reach the horizontal location that corresponds to the maximum of the cost function and an explanation of their mathematical significance will now be described. The steps are summarized in the flow chart of FIG. 9.

a) Step 0: Initial positioning of the mobile platform;
b) Step 1: Instruct the mobile platform 16 to spin slowly until the measured cost function reaches the maximum value, so that the primary and secondary coil geometries are aligned (if the coil geometry is circular this spin may not be needed).

At this point, measure the value of the cost function $\phi$, denote it by $\phi_0$, and store it.

Explanation: we let the coordinate system with respect to ground to coincide with the horizontal coordinate system of the mobile platform 16, and we keep this ground coordinate system fixed from now until the end of the present iteration. Thus $\phi_0=\phi(0,0)$ is the value of the cost function at the horizontal position that coincides with the origin of the present (temporary) ground coordinate system, and the cost function $\phi(x,y)$ is described in the present x-y coordinate system with respect to ground. At each new iteration this ground coordinate system is repositioned and may be rotated.

c) Step 2: The mobile platform 16 is instructed to take a jump $\Delta x$ to the right (in direction i). After the jump is completed, measure the value of the cost function $\phi$, denote the measured value by $\phi_x=\phi(\Delta x,0)$ and compute the ratio $$\frac{\Delta\phi}{\Delta x}=\frac{\phi_x-\phi_0}{\Delta x} \tag{2}$$

Where the value $\phi_0=\phi(0,0)$ is the value of the cost function measured in b (step 1).

Explanation: If $\Delta x$ is small, (2) is an approximation to the partial derivative $$\frac{\partial\phi}{\partial x},$$

where $\phi=\phi(x,y)$ is the cost function with respect to the ground coordinate system that we set in step 1. Thus $$\frac{\partial\phi}{\partial x}\approx\frac{\Delta\phi}{\Delta x} \tag{3}$$

The value of $\Delta x$ determined by the above theoretical considerations can be confirmed by experimental work or known or estimated from previous trials.

d) Step 3: The mobile platform 16 is repositioned to the initial location by instructing it to take a step $-\Delta x$, namely taking the same step size as before, but to the left (opposite to the direction i).

Explanation: The mobile platform is repositioned at the origin of the ground coordinate system, as set in step 1.

e) Step 4: Instruct the mobile platform to take a small jump $\Delta y$ forwards (in direction j). After the jump is completed, measure the value of the cost function $\phi$, denote the measured value by $\phi_y=\phi(0, \Delta y)$ and compute the ratio $$\frac{\Delta\phi}{\Delta y}=\frac{\phi_y-\phi_0}{\Delta y} \tag{4}$$

Explanation: If $\Delta y$ is small, (4) is an approximation to the partial derivative $$\frac{\partial\phi}{\partial y},$$

where $\phi=\phi(x,y)$ is the cost function with respect to the ground coordinate system that we set in step 1. Thus $$\frac{\partial\phi}{\Delta y}\approx\frac{\Delta\phi}{\Delta y} \tag{5}$$

f) Step 5: The mobile platform 16 is repositioned to the initial location by instructing it to take a step $-\Delta y$, namely taking the same step size as before, but backwards (opposite to the direction j).

Explanation: The mobile platform 16 is repositioned at the origin of the ground coordinate system, as set in step 1.

Note:

The sizes of $\Delta x$ and $\Delta y$ should be taken as small as possible to obtain a good approximation to the partial derivatives, but large enough so to prevent computation errors due to numerical precision or due to signal-to-noise marginality. For example, if there is "noise" in the system, the steps have to be large enough in order to overcome the noise.

g) Step 6: Compute $\nabla\phi$=the gradient of $\phi$, to be the vector $$\nabla\phi=\frac{\partial\phi}{\partial x}i+\frac{\partial\phi}{\partial y}j\approx\frac{\Delta\phi}{\Delta x}i+\frac{\Delta\phi}{\Delta y}j \tag{6}$$

Explanation: the vector $\nabla\phi$ points towards the horizontal direction corresponding to the steepest ascent of $\phi$, where $\phi=\phi(x,y)$ is the cost function with respect to the ground coordinate system as set in step 1.

h) Step 7: Compute the norm (the length) $\|\Delta\phi\|$ of $\Delta\phi$ as $$\|\nabla\phi\|=\sqrt{\left(\frac{\partial\phi}{\partial x}\right)^2+\left(\frac{\partial\phi}{\partial y}\right)^2} \tag{7}$$

Explanation: $\|\nabla\phi\|$ is the length of $\nabla\phi$, and it is equal to the local rate of increase of $\phi$ in the direction of steepest ascent at the origin of the ground coordinate system as set in step 1.

i) Step 8: Compute the unit-norm vector R in direction of $\nabla\phi$ as $$R=\frac{\nabla\phi}{\|\nabla\phi\|}=R_xi+R_yj,\ R_x=\frac{\partial\phi/\partial x}{\|\nabla\phi\|},\quad R_y=\frac{\partial\phi/\partial y}{\|\nabla\phi\|}\Rightarrow\|R\|=\sqrt{R_x^2+R_y^2}=1 \tag{8}$$

Explanation: R is the unit vector in the direction corresponding to the steepest ascent of $\phi$.

j) Step 9: Instruct the mobile platform 16 to take a jump $\gamma R$ of size $\gamma\geq 0$ in direction R, namely, move a distance $\gamma R_x$ in direction i, and a distance $\gamma R_y$ in direction j (in either order).

Explanation: move a distance $\gamma$ in the direction corresponding to the steepest ascent of $\phi$.

Notes:

a. If the computed value of $R_x$ is positive, the jump $\gamma R_x$ will be to the right, but if the computed value of $R_x$ is negative, the jump $\gamma R_x$ will be to the left.
   Similarly, if the computed value of $R_y$ is positive, the jump $\gamma R_y$ will be forwards, but if the computed value of $R_y$ is negative, the jump $\gamma R_y$ will be backwards.

b. The jump $\gamma$ should be as large as possible in order to obtain fast convergence, but must be small enough in order to not "skip" the optimal point of the cost function, because, as discussed before, the gradient points towards the local direction corresponding to the steepest ascent and not towards the direction corresponding to the global maximum. The topic of how to best choose γ depends on the actual shape of the cost function, and is largely covered in the literature under the “gradient ascent/descent” subject [6].

c. If the target is to minimize the cost function rather than maximize it, then the jump should be −γR, namely, taken in the direction of the steepest descent instead of the steepest ascent.

k) Step 10: If no substantial increase (decrease) in found in measuring the value of the cost function during several iterations, or if the variance of the displacement over several γ jumps approaches zero, then a “stable state” is declared and the alignment is terminated; else go to the next step.

l) Step 11: Go back to step 1

Although embodiments of the invention have been described by way of illustration, it will be understood that the invention may be carried out with many variations, modifications, and adaptations, without exceeding the scope of the claims.

Impedance Matching Maximization

The following explains why impedance matching maximizes the real power transfer.

The maximal power transfer from a source with impedance $Z_s$ to a load with impedance $Z_L$ occurs when $$Z_L = Z_s^*,$$

where (*) denotes complex conjugate. With V and I denoting phasors, and with reference to the section labelled “Relationship Between Gradient and Cost Function” herein below, the real power transferred to the load is $$P = \frac{1}{2}\mathrm{Re}[VI^*] = \frac{1}{2}\mathrm{Re}\left[\frac{VZ_L}{Z_s+Z_L}\cdot\left(\frac{V}{Z_s+Z_L}\right)^*\right] =$$

$$\frac{|V|^2}{2}\frac{\mathrm{Re}[Z_L]}{|Z_s+Z_L|^2} = \frac{|V|^2}{2}\frac{\mathrm{Re}[Z_L]}{(\mathrm{Re}[Z_s]+\mathrm{Re}[Z_L])^2+(\mathrm{Im}[Z_s]+\mathrm{Im}[Z_L])^2} \le$$

$$\frac{|V|^2}{2}\frac{\mathrm{Re}[Z_L]}{(\mathrm{Re}[Z_s]+\mathrm{Re}[Z_L])^2} \le \frac{|V|^2}{8\mathrm{Re}[Z_s]}$$

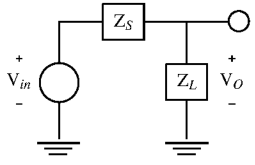

Where $\mathrm{Im}[Z_L]=-\mathrm{Im}[Z_s]$ implies that the circuit is resonant, and the source sees a real load.

Then P is maximal for $\mathrm{Re}[Z_s]=\mathrm{Re}[Z_L]$ because $$\frac{d}{dx}\left(\frac{x}{(a+x)^2}\right) = \frac{(a+x)^2-2x(a+x)}{(a+x)^4} = 0 \Rightarrow a = x$$

Relation Between Phase Difference and Real Power Transfer

The following explains why a smaller phase difference between voltage and current yields more real power.

Given the voltage v(t) and the current i(t) on a load $$v(t) = A_v\cos(\omega t+\phi_v) = \mathrm{Re}\left[Ve^{j\omega t}\right] = \frac{1}{2}\left(Ve^{j\omega t}+V^*e^{-j\omega t}\right),$$

$$V = A_v e^{j\phi_v}$$

$$i(t) = A_i\cos(\omega t+\phi_i) = \mathrm{Re}\left[Ie^{j\omega t}\right] = \frac{1}{2}\left(Ie^{j\omega t}+I^*e^{-j\omega t}\right),$$

$$I = A_i e^{j\phi_i}$$

with ω=2π/T, where T is the period of the voltage and of the current, the power (the average energy per unit time) dissipated in the load (the real power transferred to the load) is $$P = \frac{1}{T}\int_0^T v(t)i(t)dt = \frac{1}{4T}\int_0^T \left(Ve^{j\omega t}+V^*e^{-j\omega t}\right)\left(Ie^{j\omega t}+I^*e^{-j\omega t}\right)dt =$$

$$\frac{1}{2T}\int_0^T \left\{\mathrm{Re}\left[VIe^{j2\omega t}\right]+\mathrm{Re}[VI^*]\right\}dt =$$

$$\frac{1}{2T}\int_0^T \{A_vA_i\cos(2\omega t+\phi_v+\phi_i)+\mathrm{Re}[VI^*]\}dt =$$

$$\frac{1}{2}\mathrm{Re}[VI^*] + \underbrace{\frac{A_vA_i}{2T}\int_0^T \cos(2\omega t+\phi_v+\phi_i)dt}_{=0} = \frac{1}{2}\mathrm{Re}[VI^*]$$

Where (*) denotes complex conjugate, and the complex quantities V and I are referred to as “phasors”. Therefore, the real power is given in terms of phasors as $$P = \frac{1}{2}\mathrm{Re}[VI^*] = \frac{1}{2}\mathrm{Re}\left[A_vA_ie^{j(\phi_v-\phi_i)}\right] = \frac{1}{2}A_vA_i\cos(\phi_v-\phi_i)$$

Thus P is maximal if $\phi_v-\phi_i=0\Rightarrow\cos(0)=1$, namely, if both the voltage and the current have identical phase.

If the load is reactive, then $|\phi_v-\phi_i|$ approaches $$\frac{\pi}{2},$$

and cos(π/2)=0, and thus the real power approaches zero, although both voltage and current may have high peak values.

Relationship Between Gradient and Cost Function

The following explains why the gradient of ϕ points towards the horizontal direction that corresponds to the steepest ascent of ϕ.

Let i be a unit vector pointing in the positive x direction, and j be a unit vector pointing in the positive y direction, and let ϕ=ϕ(x,y) be the cost function.

The change $d\phi$ in the value of $\phi$ following a jump of size $ds=\sqrt{dx^2+dy^2}$ in direction of any vector dR=dx i+dy j in the horizontal plane, is given by:

$$\frac{d\phi}{ds}=\frac{\partial\phi}{\partial x}\frac{dx}{ds}+\frac{\partial\phi}{\partial y}\frac{dy}{ds}=\left(\frac{\partial\phi}{\partial x}i+\frac{\partial\phi}{\partial y}j\right)\cdot\left(\frac{dx}{ds}i+\frac{dy}{ds}j\right)=\nabla\phi\cdot\frac{dR}{ds} \quad \text{I)}$$

Where $$\nabla\phi=\frac{\partial\phi}{\partial x}i+\frac{\partial\phi}{\partial y}j$$

is a vector denoted as the gradient of $\phi$, and $\|\nabla\phi\|$ is the norm (the length) of $\nabla\phi$. For a jump of size ds in some direction dR=dx i+dy j in the horizontal plane, the vector $$\frac{dR}{ds}$$

has unit norm because $$\|dR\|=\sqrt{dx^2+dy^2}=ds\Rightarrow\left\|\frac{dR}{ds}\right\|=1$$

Then, from (I), regardless of the direction of dR, by the Cauchy-Schwartz inequality we get $$\left|\frac{d\phi}{ds}\right|=\left|\nabla\phi\cdot\frac{dR}{ds}\right|\leq\|\nabla\phi\|\left\|\frac{dR}{ds}\right\|=\|\nabla\phi\| \quad \text{II)}$$

Let us chose the direction dR/ds of the jump ds to be in direction $\nabla\phi$, namely $$\frac{dR}{ds}=\frac{\partial\phi/dx}{\|\nabla\phi\|}i+\frac{\partial\phi/dy}{\|\nabla\phi\|}j=\frac{\nabla\phi}{\|\nabla\phi\|} \quad \text{III)}$$

Then $$\frac{d\phi}{ds}$$

is non-negative, namely, $\phi$ increases because from (I) and (III)

$$\frac{d\phi}{ds}=\nabla\phi\cdot\frac{dR}{ds}=\nabla\phi\cdot\frac{\nabla\phi}{\|\nabla\phi\|}=\frac{\|\nabla\phi\|^2}{\|\nabla\phi\|}=\|\nabla\phi\|\geq 0 \quad \text{IV)}$$

So we got that $$\frac{d\phi}{ds}$$

is both non-negative and maximal because from (II) and (IV) it follows $$\left|\frac{d\phi}{ds}\right|\leq\|\nabla\phi\| \quad \text{V)}$$

and $$\frac{d\phi}{ds}=\|\nabla\phi\|$$

From (V) it follows that the direction of $\nabla\phi$ is the direction of steepest ascent of $\phi$, and $\|\nabla\phi\|$ equals the rate of increase of $\phi$ in that direction.

BIBLIOGRAPHY

[1] Bouanou T., El Fadil H., Lassioui A., Assaddiki O. and Njili S., "*Analysis of Coil Parameters and Comparison of Circular, Rectangular, and Hexagonal Coils Used in WPT System for Electric Vehicle Charging*", World Electric Vehicle Journal, Mar. 17, 2021.

[2] Patil D., Mcdonough M. K., Miller J. M., Fahimi B., and Balsara P. T., "*Wireless Power Transfer for Vehicular Applications: Overview and Challenges*", IEEE Transactions on Transportation Electrification, Vol. 4, No. 1, March 2018

[3] Abdolkhani A., "*Fundamentals of Inductively Coupled Wireless Power Transfer Systems*", IntechOpen Book Series, 2016, https://www.intechopen.com/chapters/50520

[4] Kurs A., Karalis A., Moffatt, R., Joannopoulos J. D., Fisher P., Soljačić M., "*Wireless Power Transfer via Strongly Coupled Magnetic Resonances*". Science 2007, 317, 83-86

[5] Clarke K. K. and Hess D. T., "*Communication Circuits: Analysis and Design*", Krieger 1994

[6] Gradient Descent, https://en.wikipedia.org/wiki/Gradient_descent

[7] Zicheng B., Tianze K., Chunting C., Yiming Z., Zhengming Z., Gregory A. K., "A review of wireless power transfer for electric vehicles: Prospects to enhance sustainable mobility", Elsevier, 2016.

[8] EP2684733

[9] WO2014/33094

The invention claimed is:

1. A mobile platform for wirelessly charging an in-vehicle rechargeable battery by a charge receiver in an electric vehicle (EV) that is located in a stationary location on a surface, the mobile platform comprising:

a charge transmitter for generating a field for a wireless charging by a wireless energy transfer to the charge receiver in the field;

a movement sensor that provides an output in response to a movement of the platform;

multiple wheels that are independently-controlled for moving the platform on the surface;

a drive chain for powering the multiple wheels for propelling and steering the platform on the surface;

a wireless transmitter for transmitting data to, and a wireless receiver for receiving data from, a wireless network;

a memory storing software, and a processor coupled to the memory for executing the software;

a rechargeable electric power storage for electrically powering the charge transmitter, the movement sensor, the memory, the drive chain, the wireless transmitter, the wireless receiver, and the processor; and a housing sized and shaped to fit under the EV, wherein the rechargeable electric power storage, the charge transmitter, the movement sensor, the memory, the processor, the drive chain, the wireless transmitter, the wireless receiver, or any combination thereof, are attached to, or mounted in, the housing, wherein the processor is coupled to the movement sensor and to the drive chain for controlling the propelling and steering to automatically travel to the EV location in response to a receiving of a message over the wireless network that is indicative of the EV stationary location, wherein the platform is further configured for localizing the housing under the EV using a feedback-based closed control loop of the wireless energy transfer of the in-vehicle rechargeable battery by the charge transmitter, and wherein the platform is further configured for vertically moving the charge transmitter upwards or downwards for optimizing of the wireless energy transfer between the platform and the EV.

2. The platform according to claim 1, wherein the field is a magnetic field, and wherein the wireless energy transfer uses, comprises, or is based on, a near-field inductive energy transfer that uses magnetic field resonant coupling.

3. The platform according to claim 2, for use with a first coil in the charge receiver, wherein the charge transmitter comprises a second coil that is configured for inductive energy transfer with the first coil when the housing is under the EV.

4. The platform according to claim 3, further comprising a compensating network connected to the second coil, wherein the second coil is circular, rectangular, Haxagonal, or Double D (DD) shaped.

5. The platform according to claim 2, wherein the wireless energy transfer uses a frequency that is in a 20 KHz-100 KHz frequency band, or wherein the wireless energy transfer uses a frequency that is in a 81.39 KHz-90 KHz frequency band.

6. The platform according to claim 1, for use with a first plate in the charge receiver, wherein the field is an electric field, wherein the wireless energy transfer comprises, or is based on, a near-field capacitive energy transfer that uses an electric field coupling, and wherein the charge transmitter comprises a second plate that is configured for capacitive energy transfer with the first plate when the housing is under the EV.

7. The platform according to claim 1, wherein the wireless energy transfer is according to, based on, compliant with, or compatible with, a Wireless Power Transmission (WPT) standard that is according to, based on, compliant with, or compatible with, an SAE International SAE Technical Information Report (TIR) J2954, SAE J2954, SAE J2954/1, SAE J2954/2, or SAE J2846/7 standard.

8. The platform according to claim 1, wherein the localizing uses, is based on, or uses, an orientation or rotation of the EV that is received from the wireless network by the wireless receiver.

9. The platform according to claim 1, wherein the rechargeable electric power storage comprises one or more rechargeable batteries, and wherein each one of the multiple wheels comprises a respective omni or Mechanum wheel.

10. The platform according to claim 1, wherein the charge transmitter, the movement sensor, the memory, the drive chain, the wireless transmitter, the wireless receiver, the rechargeable electric power storage, the processor, or any combination thereof, are non-removably embedded in the housing.

11. The platform according to claim 10, further comprising a camera configured for detecting an attempt to forcefully gain access or, or to remove an element from, the housing, and wherein the platform is further configured to provide an alarm or visual output in response to the detecting.

12. The platform according to claim 1, wherein the EV comprises an electric vehicle, a hybrid vehicle, a private sedan vehicle, a Recreational Vehicle (RV), a minivan, a pickup truck, a delivery van, an ambulance, a commercial truck, or any combination thereof.

13. The platform according to claim 1, further configured to record activities of the platform and to store the recorded activities in the memory.

14. The platform according to claim 1, further comprising a location sensor for providing an estimated location of the platform in a coordinate system to the processor, wherein the platform is further configured to automatically travel to the EV location using, or based on, the estimated location.

15. The platform according to claim 14, for use with multiple Radio-Frequency (RF) signals transmitted by multiple sources, wherein the location is estimated by receiving of the RF signals from the multiple sources via one or more antennas, and processing or comparing the received RF signals.

16. The platform according to claim 15, wherein the multiple sources comprise satellites that are part of Global Navigation Satellite System (GNSS).

17. The platform according to claim 16, wherein the GNSS comprises a Global Positioning System (GPS) and the location sensor comprises a GPS antenna coupled to a GPS receiver for receiving and analyzing GPS signals, or wherein the GNSS comprises a GLObal NAvigation Satellite System (GLONASS) and the location sensor comprises a GLONASS antenna coupled to a GLONASS receiver for receiving and analyzing GLONASS signals.

18. The platform according to claim 1, wherein the memory further stores a map, and wherein the platform automatically travels to the EV location using, or based on, the stored map.

19. The platform according to claim 18, wherein the platform automatically travels to the EV using, or based on, a dead reckoning.

20. The platform according to claim 14, for use in an area that comprises multiple markers detectable by the location sensor, wherein the platform automatically travels to the EV location using, or based on, the multiple markers.

21. The platform according to claim 20, wherein the markers comprise optical markers, Wireless Personal Area Network (WPAN) markers, Bluetooth markers, Radio Frequency Identification (RFID) based markers, or any combination thereof.

22. The platform according to claim 1, further comprising an object detector coupled to the processor for detecting an obstacle when the platform automatically travels to the EV location.

23. The platform according to claim 22, further configured to provide a warning, to stop the travelling, to change a travel route to the EV location, or any combination thereof, in response to the detecting of the obstacle.

24. The platform according to claim 1, further comprising a navigation software stored in the memory for controlling the platform along a route to the EV or from the EV, and wherein the platform is further configured for travelling to or from the EV along an available energy efficient route.

25. The platform according to claim 1, wherein the movement sensor comprises an inertial sensor for sensing a movement of the housing, and wherein the platform is configured to automatically travel to the EV location using, or based on, the sensed movement.

26. The platform according to claim 25, wherein the inertial sensor comprises, is based on, or is part of, an accelerometer or a gyroscope.

27. The platform according to claim 1, wherein the movement sensor comprises a non-inertial sensor for sensing an environmental condition.

28. The platform according to claim 27, wherein the non-inertial sensor comprises, is based on, or is part of, a barometer, an altimeter, a magnetometer, a light sensor, a camera, an additional wireless receiver, or any combination thereof.

29. The platform according to claim 27, wherein the non-inertial sensor comprises, is based on, or is part of, an additional wireless receiver that is based on, or is part of, a Radio Frequency Identification (RFID) receiver, a Bluetooth receiver, a Global Positioning System (GPS) receiver, or a GLObal NAvigation Satellite System (GLONASS) receiver.

30. The platform according to claim 1, wherein the wireless network comprises, uses, or is compatible with, a Wireless Local Area Network (WLAN), the wireless transmitter comprises a WLAN transmitter, and the wireless receiver comprises a WLAN receiver, or wherein the wireless network comprises, uses, or is compatible with, a Wireless Personal Area Network (WPAN), the wireless transmitter comprises a WPAN transmitter, and the wireless receiver comprises a WPAN receiver.

31. The platform according to claim 30, wherein the wireless network comprises, uses, or is compatible with, a WPAN that comprises, is based on, or is compatible with, Bluetooth.

32. The platform according to claim 1, further comprising a first sensor that provides an output value that is responsive to an amount of energy transferred over the wireless energy transfer from the charge transmitter to the charge receiver.

33. The platform according to claim 32, wherein the localizing comprises travelling to a position and orientation using the output value as an input to the feedback-based closed control loop for optimal energy transfer.

34. The platform according to claim 32, for use with a threshold, wherein the platform moves in response to the output value being above or below the threshold.

35. The platform according to claim 32, wherein the output value is responsive to a measured or detected magnetic field feature or characteristic.

36. The platform according to claim 35, wherein the output value is responsive to a magnetic field strength, to a magnetic field direction, or any combination thereof.

37. The platform according to claim 35, wherein the output value is responsive to a magnetic field rate of change, to a magnetic field frequency, or any combination thereof.

38. The platform according to claim 32, wherein the output value is responsive to a measured or detected voltage or current supplied to the charge transmitter, to a phase difference between the measured voltage and current supplied to the charge transmitter, or any combination thereof, and wherein the first sensor comprises a Hall-effect sensor.

39. The platform according to claim 1, further comprising a first sensor that provides an output value that is proportional to, or indicative of, a real power delivered by the charge transmitter to the charge receiver.

40. The platform according to claim 39, for use with an optimal location on the surface of the housing relative to the EV stationary location that provides a maximum value of the real power delivered by the charge transmitter to the charge receiver, wherein the localizing comprises arriving to the optimal location using the output value as an input to the feedback-based control loop.

41. The platform according to claim 40, wherein the optimal location is a global maximum or a local maximum location, and wherein the platform is configured to perform multiple iterations until arriving to the optimal location.

42. The platform according to claim 41, wherein the platform is configured to perform a 'Gradient Ascent' or 'Gradient Descent' scheme for arriving to the optimal location.

43. The platform according to claim 41, wherein each iteration comprises a movement increment in a first direction, followed by a movement increment in a second direction that is perpendicular to the first direction.

44. The platform according to claim 41, wherein each iteration further comprises a rotation of the platform.

45. The platform according to claim 1, for use with a control device that communicates with the platform over the wireless network, wherein the platform is further configured to transmit, to the control device over the wireless network using the wireless transmitter, a movement sensor output, and to receive, from the control device over the wireless network using the wireless receiver, a command that is responsive to the movement sensor output.

46. The platform according to claim 45, wherein the automatically travel to the EV location is based on, or in response to, the received command.

47. The platform according to claim 1, for use with a charging station that is powered by an electricity grid, wherein the platform is further configured to automatically travel to the charging station for charging the rechargeable electric power storage from the electricity grid by the charging station.

48. The platform according to claim 47, further for use with an electric socket in the charging station that comprises slots for providing an electric power, wherein the platform further comprises mating prongs for insertion to the electric socket for receiving the electric power therefrom, or for use with an electric socket in the charging station that comprises prongs for providing an electric power, wherein the platform further comprises mating slots for insertion to the electric socket for receiving the electric power therefrom.

49. The platform according to claim 47, wherein the charging from the charging station comprises wirelessly charging.

50. The platform according to claim 47, wherein the charging from the charging station ends in response to sensing that the rechargeable electric power storage is fully charged, or wherein the charging from the charging station ends in response to receiving by the wireless receiver of a message from the wireless network.

* * * * *